(12) United States Patent
Xu et al.

(10) Patent No.: US 10,721,734 B2
(45) Date of Patent: Jul. 21, 2020

(54) METHOD, DEVICE, BASE STATION AND UE FOR UPLINK TRANSMISSION MAIN CARRIER SWITCH AND CONTROL

(71) Applicant: China Academy of Telecommunications Technology, Beijing (CN)

(72) Inventors: Fangli Xu, Beijing (CN); Wei Bao, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 89 days.

(21) Appl. No.: 15/507,713

(22) PCT Filed: Aug. 27, 2015

(86) PCT No.: PCT/CN2015/088281
§ 371 (c)(1),
(2) Date: Feb. 28, 2017

(87) PCT Pub. No.: WO2016/029864
PCT Pub. Date: Mar. 3, 2016

(65) Prior Publication Data
US 2017/0290015 A1    Oct. 5, 2017

(30) Foreign Application Priority Data
Aug. 29, 2014   (CN) .......................... 2014 1 0438699

(51) Int. Cl.
*H04W 72/04*    (2009.01)
*H04W 36/00*    (2009.01)
(Continued)

(52) U.S. Cl.
CPC ....... *H04W 72/0453* (2013.01); *H04W 36/00* (2013.01); *H04W 36/28* (2013.01);
(Continued)

(58) Field of Classification Search
CPC ......... H04W 72/0453; H04W 36/0027; H04W 36/08; H04W 36/00; H04W 36/28;
(Continued)

(56) References Cited

U.S. PATENT DOCUMENTS

| | | | | |
|---|---|---|---|---|
| 8,620,334 B2* | 12/2013 | Terry | ................... | H04L 1/0023 455/450 |
| 9,008,050 B2* | 4/2015 | Feuersanger | ....... | H04W 52/281 370/336 |

(Continued)

FOREIGN PATENT DOCUMENTS

| | | |
|---|---|---|
| CN | 101834692 | 9/2010 |
| CN | 102349259 | 2/2012 |

(Continued)

OTHER PUBLICATIONS

3GPP, "3rd Generation Partnership Project; Technical Specification Group Services and System Aspects; Intra-domain connection of Radio Access Network (RAN) nodes to multiple Core Network (CN) nodes (Release 8)," Dec. 2009, 3GPP TS 23.236 V8.1.0 (Year: 2009).*

(Continued)

*Primary Examiner* — Michael Thier
*Assistant Examiner* — Nevena Zecevic Sandhu
(74) *Attorney, Agent, or Firm* — Foley & Lardner LLP

(57) ABSTRACT

A method, device, base station and UE for uplink transmission main carrier switch and control to enable the uplink transmission main carrier of the UE to switch among multiple different cells providing service for the UE, enhance the transmission flexibility of the uplink transmission main carrier of the UE, and at the same time take account of the transmission requirements of transmission power and UE services. The method for uplink transmission main carrier switch and control includes: determining the transmission (Continued)

Determine transmission resources of a set of cells configured for the UE to serve the UE, including configured resources of uplink transmission resources of a plurality of cells so as to switch an uplink transmission primary carrier of the UE among the uplink transmission carriers corresponding to the different cells — 202

Notify the UE of the transmission resources of the set of cells — 204 resources of the cell set used for providing service for the UE, the transmission resources being configured for the user equipment (UE), wherein the transmission resources include the configured resources of uplink transmission carrier of multiple cells, the transmission resources being used for enabling the uplink transmission main carrier of UE to switch among the uplink transmission carriers corresponding to different cells; informing the UE of the transmission resource of the cell set.

18 Claims, 3 Drawing Sheets

(51) Int. Cl.
  *H04W 36/28* (2009.01)
  *H04W 36/08* (2009.01)
(52) U.S. Cl.
  CPC .... *H04W 72/0413* (2013.01); *H04W 36/0027* (2013.01); *H04W 36/08* (2013.01)
(58) Field of Classification Search
  CPC ........... H04W 72/0413; H04W 52/327; H04W 52/281; H04W 52/346; H04L 5/001; H04L 5/0053; H04L 5/0094; H04L 5/1469; H04L 5/0098
  See application file for complete search history.

(56) References Cited

U.S. PATENT DOCUMENTS

| | | | | |
|---|---|---|---|---|
| 9,042,891 | B2* | 5/2015 | Morioka | H04W 36/0072 370/331 |
| 9,203,566 | B2* | 12/2015 | Terry | H04L 5/001 |
| 9,474,003 | B2* | 10/2016 | Yang | H04L 5/001 |
| 2005/0123301 | A1* | 6/2005 | Kallstenius | H04B 10/1125 398/115 |
| 2010/0303039 | A1* | 12/2010 | Zhang | H04L 5/0035 370/331 |
| 2011/0130092 | A1* | 6/2011 | Yun | H04W 72/085 455/39 |
| 2011/0149913 | A1 | 6/2011 | Park et al. | |
| 2012/0002643 | A1* | 1/2012 | Chung | H04J 11/0093 370/331 |
| 2012/0044812 | A1* | 2/2012 | Hiddink | H04W 36/0044 370/241 |
| 2012/0113914 | A1* | 5/2012 | Zhao | H04L 5/0007 370/329 |
| 2012/0269148 | A1 | 10/2012 | Hultell et al. | |
| 2013/0010619 | A1* | 1/2013 | Fong | H04W 74/002 370/252 |
| 2014/0003250 | A1* | 1/2014 | Seo | H04W 36/0083 370/241 |
| 2014/0023043 | A1* | 1/2014 | Yang | H04W 36/0072 370/331 |

FOREIGN PATENT DOCUMENTS

| | | |
|---|---|---|
| CN | 102612851 A | 7/2012 |
| CN | 103081531 A | 5/2013 |
| CN | 103327533 | 9/2013 |
| JP | 2012-520633 A | 9/2012 |
| JP | 2013-530636 A | 7/2013 |
| JP | 2014-529222 A | 10/2014 |
| KR | 1020110135404 A | 12/2011 |
| KR | 1020140051829 A | 5/2014 |
| WO | WO-2010/105254 A2 | 9/2010 |
| WO | WO-2011/059373 A1 | 5/2011 |
| WO | WO-2013/3025059 A2 | 2/2013 |

OTHER PUBLICATIONS

R2-124777"Considerations of PCell change without handover" 3GPP TSG RAN WG2 Meeting #79bis, Oct. 8-12, 2012,4 pages, New Postcom, Slovakia, Bratislava.

* cited by examiner

-- Prior Art --

METHOD, DEVICE, BASE STATION AND UE FOR UPLINK TRANSMISSION MAIN CARRIER SWITCH AND CONTROL

This application is a US National Stage of International Application No. PCT/CN2015/088281, filed Aug. 27, 2015, designating the United States, and claiming the benefit of Chinese Patent Application No. 201410438699.X, filed with the Chinese Patent Office on Aug. 29, 2014 and entitled "Methods and apparatuses for switching an uplink transmission primary carrier, and for controlling the switching, a base station, and a UE", which is hereby incorporated by reference in its entirety.

FIELD

The present invention relates to the field of communications, and particularly to methods and apparatuses for switching an uplink transmission primary carrier, and for controlling the switching, a base station, and a user equipment.

BACKGROUND

As the coverage area of the Long Term Evolution (LTE) network is growing constantly, and the LTE technologies are developing constantly, a demand for a capacity may be difficult to satisfy in the traditional scheme of coverage by a macro cell due to an increasing number of subscribers, and a growing demand for a bandwidth, so that a demand of subscribers for traffic may not be satisfied simply in the simple macro coverage scheme particularly in some densely populated region where there may be a blind area in the homogenous coverage scheme, thus discouraging the subscribers from an access thereto. In view of this, the heterogeneous network has been introduced in LTE so that the LTE network can be deployed in a more flexibly pattern, and also the concept of a small cell has been proposed in that the small cell typically has a smaller coverage area and lower transmit power, and the small cell can be deployed at a shorter distance from the subscribers, e.g., indoors, to thereby improve the data rate of the subscribers.

There are significantly improved required peak rates of the Long Term Evolution-Advanced (LTE-A) system up to 1 Gbps in the downlink and 500 Mbps in the uplink as compared with the LTE system. The LTE-A system is also required to be well compatible with the LTE system. Carrier Aggregation (CA) has been introduced to the LTE-A system to thereby accommodate the improved peak rates, compatibility with the LTE system, and full use of spectrum resources as needed.

Carrier aggregation refers to such a mechanism that a plurality of cells can be aggregated for a User Equipment (UE) (also referred to a terminal), and can provide the UE concurrently with a data transmission service. Carriers corresponding to the respective cells in the system with carrier aggregation can be consecutive or inconsecutive in frequency, and there is a bandwidth up to 20 MHz of a carrier of each cell for compatibility with the LTE system, where there may be the same bandwidth or different bandwidths of the respective component carriers.

With carrier aggregation, the cells over which the user equipment operates include one Primary Cell (PCell) and several Secondary Cells (SCells), where the primary cell is responsible for the majority of control and signaling, for example, transmitting an A/N feedback for downlink data, a Channel State Information (CSI) report, a Sounding Reference Signal (SRS), and a Dedicated Scheduling Request (D-SR), making a Contention Based Random Access (CBRA), etc., where a Physical Uplink Control Channel (PUCCH) is only active over the PCell; and the secondary cells are primarily responsible for acting as resources over data are transmitted, where a Physical Uplink Shared Channel (PUSCH) and an SRS can be transmitted in the uplink.

At present, the UE can not be configured with a set of serving cells beyond a capacity of aggregated carriers for the UE, that is, the UE for which no uplink carriers can be aggregated can only operate over the PCell in the uplink, that is, an uplink transmission primary carrier can only be active over the PCell.

In the scenario of carrier aggregation, in order for the UE to save its power, the activation/deactivation mechanism has been introduced. In the LTE-A system, a cell is activated or deactivated, particularly explicitly or implicitly, without distinguishing between the uplink and the downlink. It shall be noted that the cell can be deactivated only implicitly.

In the explicit activation mechanism, the base station transmits an activation or deactivation Media Access Control-Control Element (MAC CE) to control the active state of the aggregated cells of the UE. FIG. 1 illustrates the format of the activation or deactivation MAC CE, where the length of the activation or deactivation MAC CE is 8 bits including $C_7$, $C_6$, $C_5$, $C_4$, $C_3$, $C_2$, $C_1$, and R respectively, each of which corresponds to a cell, that is, the last bit corresponds to the PCell, where since the PCell will never be deactivated, the R bit is defaulted as 0; and the other bits correspond respectively to respective SCells, that is, $C_i$ corresponds to the SCell numbered i. If $C_i$ is "i=1", then it will indicate that the SCell is activated, and if $C_i$ is "i=0", then it will indicate that the SCell is deactivated.

In the implicit deactivation mechanism, the cell is deactivated implicitly by introducing a deactivation timer configured per UE, and maintained per cell. If the base station does not configure the timer, then the length of the timer will be defaulted as the infinity.

The deactivation timer is maintained per cell as follows: if the UE receives activation signaling for some cell, then the UE will start/restart the deactivation timer corresponding to the cell; and while the timer is operating, once the UE receives scheduling signaling for uplink or downlink transmission over the cell, then the UE will restart the deactivation timer of the cell. It shall be noted that if there is across-carrier scheduling, then both the deactivation timers of the scheduling and scheduled cells will be started, where the scheduling signaling for uplink or downlink data transmission will be carried over a Physical Control Channel (PDCCH); and if the deactivation timer expires, then the UE will deactivate the cell.

In summary, there are base stations of a macro cell and small cells in the scenario of heterogeneous network deployment. Since the distance between the UE, and a transmitter of the macro cell is typically longer than the distance between the UE, and a transmitter in a network of the small cells, if carriers are aggregated for transmission by the UE, then if the macro cell is configured as a PCell of the UE, then an uplink transmission carrier of the UE will be transmitted only over the PCell at high transmit power, thus resulting in significant interference to another UE; and if a small cell is configured as a PCell of the UE, then since there is such a small coverage area of the small cell that a cell handover has to be made frequently while the UE is moving, thus interrupting service transmission during the handover, which may significantly degrade the performance, and also increase a signaling load in a core network. In the prior art, the cell handover is made as a handover among the cells for both the uplink transmission carrier and a downlink transmission carrier of the UE instead of a handover among the cells for only the uplink transmission carrier of the UE, thus failing to consider both the transmission advantages of the different cells.

SUMMARY

Embodiments of the invention provide methods and apparatuses for switching an uplink transmission primary carrier, and for controlling the switching, a base station, and a user equipment so as to switch an uplink transmission primary carrier of the UE among a plurality of different cells serving the UE to thereby enhance the flexibility in transmitting over the uplink transmission primary carrier of the UE while considering both transmit power, and a demand of the UE for service transmission.

A method for controlling an uplink transmission primary carrier switch according to some embodiments of the invention includes: determining transmission resources of a set of cells configured for a UE to serve the UE, including configured resources of uplink transmission resources of a plurality of cells so as to switch an uplink transmission primary carrier of the UE among the uplink transmission carriers corresponding to the different cells; and notifying the UE of the transmission resources of the set of cells.

In the method above for controlling the switching according to the embodiment of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In a possible implementation, in the method above for controlling the switching according to the embodiment of the invention, the configured resources of the uplink transmission carrier of each cell include CBRA, D-SR, and PUCCH resources.

In a possible implementation, in the method above for controlling the switching according to the embodiment of the invention, the method further includes: instructing the UE to switch the uplink transmission primary carrier.

In the method above for controlling the switching according to the embodiment of the invention, the base station instructs the UE to switch the uplink transmission primary carrier, and if there are more than two cells to serve the UE, then a cell to be selected will be determined directly among the plurality of cells to thereby improve the accuracy in switching the cell.

In a possible implementation, in the method above for controlling the switching according to the embodiment of the invention, instructing the UE to switch the uplink transmission primary carrier includes: instructing the UE via a layer-3, layer-2, or layer-1 command to select an uplink transmission carrier of a specific cell as the uplink transmission primary carrier; or notifying the UE via a layer-3, layer-2, or layer-1 command about sub-frame configuration information of the uplink transmission primary carrier, including a correspondence relationship between a cell corresponding to the uplink transmission primary carrier, and a sub-frame; or deactivating configured resources of an uplink transmission carrier of a secondary cell which is currently the uplink transmission primary carrier of the UE to instruct the UE to select an uplink transmission carrier of a primary cell as the uplink transmission primary carrier.

In a possible implementation, in the method above for controlling the switching according to the embodiment of the invention, if the UE is instructed via the layer-3 command to select the uplink transmission carrier of the specific cell as the uplink transmission primary carrier, then the layer-3 command will further includes configured resources of the uplink transmission carrier of the specific cell.

In a possible implementation, in the method above for controlling the switching according to the embodiment of the invention, the number of cells providing the UE with configured resources of uplink transmission carriers is more than or equal to the largest number of cells corresponding to uplink transmission carriers over which the UE really transmits in the uplink.

In a possible implementation, in the method above for controlling the switching according to the embodiment of the invention, before the transmission resources of the set of cells configured for the UE to serve the UE are determined, the method further includes: receiving capability information reported by the UE about a capability of the UE to support switching of the uplink transmission primary carrier; and determining the transmission resources of the set of cells configured for the UE to serve the UE includes determining the transmission resources of the set of cells configured for the UE to serve the UE, based upon the capability information reported by the UE.

A method for switching an uplink transmission primary carrier according to some embodiments of the invention includes: obtaining, by a Use Equipment (UE), transmission resources of a set of cells configured for the UE to serve the UE, including configured resources of uplink transmission resources of a plurality of cells, as notified by the network side; and if the UE determines that an uplink transmission primary carrier needs to be switched, then switching, by the UE, the uplink transmission primary carrier to an uplink transmission carrier corresponding to a new cell, over the configured resources of the uplink transmission carrier of the new cell.

In the method for switching an uplink transmission primary carrier according to the embodiment of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In a possible implementation, in the switching method above according to the embodiment of the invention, the UE determines that the uplink transmission primary carrier needs to be switched, according to an instruction transmitted by the network side to switch the uplink transmission primary carrier.

In a possible implementation, in the method above for switching an uplink transmission primary carrier according to the embodiment of the invention, the network side instructs the UE to switch the uplink transmission primary carrier, and if there are more than two cells to serve the UE, then a cell to be selected will be determined directly among the plurality of cells to thereby improve the accuracy in switching the cell.

In a possible implementation, in the switching method above according to the embodiment of the invention, the UE receives the instruction transmitted by the network side to switch the uplink transmission primary carrier, in one of the following schemes: the UE receives an instruction transmitted by the network side to select an uplink transmission carrier of a specific cell as the uplink transmission primary carrier, via a layer-3, layer-2, or layer-1 command; or the UE receives a notification transmitted by the network side about sub-frame configuration information of the uplink transmission primary carrier, including a correspondence relationship between a cell corresponding to the uplink transmission primary carrier, and a sub-frame; or the UE receives a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

In a possible implementation, in the switching method above according to the embodiment of the invention, if the UE receives the instruction transmitted by the network side to select the uplink transmission carrier of the specific cell as the uplink transmission primary carrier, via the layer-3 command, then the method will further includes: obtaining, by the UE, configured resources of the uplink transmission carrier of the specific cell from the layer-3 command; and switching, by the UE, the uplink transmission primary carrier to the uplink transmission carrier corresponding to the new cell, over the configured resources of the uplink transmission carrier of the new cell includes: switching, by the UE, the uplink transmission primary carrier to the uplink transmission carrier corresponding to the new cell over the configured resources of the uplink transmission carrier of the specific cell obtained from the layer-3 command.

In a possible implementation, in the switching method above according to the embodiment of the invention, determining, by the UE, that the uplink transmission primary carrier needs to be switched, in one of the following schemes: determining, by the UE, that a transmission carrier where a preamble sequence is active needs to be selected as the uplink transmission primary carrier, in a random access procedure initiated by the UE; determining, by the UE, that a carrier where a D-SR is active needs to be selected as the uplink transmission primary carrier, in a D-SR procedure initiated by the UE; and determining, by the UE, that an uplink transmission carrier of one of the plurality of cells needs to be selected as the uplink transmission primary carrier, upon reception of an uplink scheduling command transmitted by the network side for the cell.

In a possible implementation, in the switching method above according to the embodiment of the invention, if the UE determines that the transmission carrier where the preamble sequence is active needs to be selected as the uplink transmission primary carrier, in the random access random initiated by the UE, then the method will further include: if the UE currently selects an uplink transmission carrier of a secondary cell as the uplink transmission primary carrier, and the secondary cell is not configured with CBRA and D-SR resources, then if the UE needs to initiate an uplink scheduling request, then switching, by the UE, to a primary cell to initiate a CBRA, and selecting an uplink transmission carrier of the primary cell as the uplink transmission primary carrier; or if the UE currently selects an uplink transmission carrier of a secondary cell as the uplink transmission primary carrier, and the secondary cell is only configured with a D-SR resource, then if the UE fails to transmit a D-SR over the secondary cell, then switching, by the UE, to a primary cell to initiate a CBRA, and selecting the uplink transmission carrier of the primary cell as the uplink transmission primary carrier; or if the UE currently selects an uplink transmission carrier of a secondary cell as the uplink transmission primary carrier, and the transmission quality of the secondary cell is not satisfactory, then selecting, by the UE, the uplink transmission carrier of the primary cell as the uplink transmission primary carrier, and initiating an RA update.

In a possible implementation, in the switching method above according to the embodiment of the invention, if the UE determines that the carrier where the D-SR is active needs to be selected as the uplink transmission primary carrier, in the D-SR procedure initiated by the UE, then the method will further include: if the UE currently selects an uplink transmission carrier of a secondary cell as the uplink transmission primary carrier, and the secondary cell is not configured with CBRA and D-SR resources, then if the UE needs to initiate an uplink scheduling request, then switching, by the UE, to a primary cell to initiate a D-SR, and selecting an uplink transmission carrier of the primary cell as the uplink transmission primary carrier.

In a possible implementation, in the switching method above according to the embodiment of the invention, for the deselected uplink transmission carrier, the method further includes any one or more of the steps of: maintaining, by the UE, all the configured resources of the uplink transmission carrier; stopping, by the UE, all the transmission over the uplink transmission carrier; clearing, by the UE, a Hybrid Automatic Repeat Request (HARQ) buffer corresponding to the uplink transmission carrier, and uplink grant information corresponding to the uplink transmission carrier; and resetting, by the UE, an uplink Media Access Control (MAC) related context.

In a possible implementation, in the switching method above according to the embodiment of the invention, the method further includes: if the UE currently selects an uplink transmission carrier corresponding to a primary cell as the uplink transmission primary carrier, then if the UE receives a command transmitted by the network side to activate a secondary cell, then only activating, by the UE, the downlink transmission resource of the secondary cell; and if the UE currently selects an uplink transmission carrier corresponding to a secondary cell as the uplink transmission primary carrier, then if the UE receives a command transmitted by the network side to deactivate the secondary cell, then only deactivating, by the UE, the uplink transmission resource of the secondary cell, and selecting an uplink transmission carrier corresponding to a primary cell as the uplink transmission primary carrier.

In a possible implementation, in the switching method above according to the embodiment of the invention, before the UE obtains the transmission resources of the set of cells for serving the UE as notified by the network side, the method further includes: reporting, by the UE, capability information about a capability of the UE to support switching the uplink transmission primary carrier to the network side.

In a possible implementation, in the switching method above according to the embodiment of the invention, if the UE determines that the uplink transmission primary carrier needs to be switched, at an instance n of time, then the UE will validate a new uplink transmission primary carrier at an instance n+k of time, wherein k>=0; and stop transmitting over the original uplink transmission primary carrier at the instance n of time, or the instance n+k of time.

An apparatus for controlling an uplink transmission primary carrier switch according to some embodiments of the invention includes: a resource determining unit configured to determine transmission resources of a set of cells configured for a UE to serve the UE, including configured resources of uplink transmission resources of a plurality of cells so as to switch an uplink transmission primary carrier of the UE among the uplink transmission carriers corresponding to the different cells; and a transmitting unit connected with the resource determining unit, configured to notify the UE of the transmission resources of the set of cells.

In the apparatus above for controlling an uplink transmission primary carrier switch according to the embodiment of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In a possible implementation, in the apparatus above for controlling the switching according to the embodiment of the invention, the configured resources of the uplink transmission carrier of each cell include CBRA, D-SR, and PUCCH resources.

In a possible implementation, in the apparatus above for controlling the switching according to the embodiment of the invention, the transmitting unit is further configured: to instruct the UE to switch the uplink transmission primary carrier.

In a possible implementation, in the apparatus above for controlling an uplink transmission primary carrier switch according to the embodiment of the invention, the base station instructs the UE to switch the uplink transmission primary carrier, and if there are more than two cells to serve the UE, then a cell to be selected will be determined directly among the plurality of cells to thereby improve the accuracy in switching the cell.

In a possible implementation, in the apparatus above for controlling the switching according to the embodiment of the invention, the transmitting unit configured to instruct the UE to switch the uplink transmission primary carrier is configured: to instruct the UE via a layer-3, layer-2, or layer-1 command to select an uplink transmission carrier of a specific cell as the uplink transmission primary carrier; or to notify the UE via a layer-3, layer-2, or layer-1 command about sub-frame configuration information of the uplink transmission primary carrier, including a correspondence relationship between a cell corresponding to the uplink transmission primary carrier, and a sub-frame; or to deactivate configured resources of an uplink transmission carrier of a secondary cell which is currently the uplink transmission primary carrier of the UE to instruct the UE to select an uplink transmission carrier of a primary cell as the uplink transmission primary carrier.

In a possible implementation, in the apparatus above for controlling the switching according to the embodiment of the invention, the transmitting unit is configured to instruct the UE via the layer-3 command to select the uplink transmission carrier of the specific cell as the uplink transmission primary carrier, wherein the layer-3 command further includes configured resources of the uplink transmission carrier of the specific cell.

In a possible implementation, in the apparatus above for controlling an uplink transmission primary carrier switch according to the embodiment of the invention, the number of cells providing the UE with configured resources of uplink transmission carriers is more than or equal to the largest number of cells corresponding to uplink transmission carriers over which the UE really transmits in the uplink.

In a possible implementation, in the apparatus above for controlling the switching according to the embodiment of the invention, the apparatus further includes a receiving unit connected with the resource determining unit, configured to receive capability information reported by the UE about a capability of the UE to support switching of the uplink transmission primary carrier, before the transmission resources of the set of cells configured for the UE to serve the UE are determined; and the resource determining unit configured to determine the transmission resources of the set of cells configured for the UE to serve the UE is configured to determine the transmission resources of the set of cells configured for the UE to serve the UE, based upon the capability information reported by the UE.

An apparatus for controlling an uplink transmission primary carrier switch according to some embodiments of the invention includes: an obtaining unit configured to obtain transmission resources of a set of cells configured for the UE to serve the UE, including configured resources of uplink transmission resources of a plurality of cells, as notified by the network side; and a processing unit connected with the obtaining unit, configured, if the apparatus determines that an uplink transmission primary carrier needs to be switched, to switch the uplink transmission primary carrier to an uplink transmission carrier corresponding to a new cell, over the configured resources of the uplink transmission carrier of the new cell.

In the apparatus above for controlling an uplink transmission primary carrier switch according to the embodiment of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In a possible implementation, in the switching apparatus above according to the embodiment of the invention, the processing unit is configured to determine that the uplink transmission primary carrier needs to be switched, according to an instruction transmitted by the network side to switch the uplink transmission primary carrier.

In the apparatus above for controlling an uplink transmission primary carrier switch according to the embodiment of the invention, the network side instructs the UE to switch the uplink transmission primary carrier, and if there are more than two cells to serve the UE, then a cell to be selected will be determined directly among the plurality of cells to thereby improve the accuracy in switching the cell.

In a possible implementation, in the switching apparatus above according to the embodiment of the invention, the processing unit is configured to receive the instruction transmitted by the network side to switch the uplink transmission primary carrier, in one of the following schemes: the processing unit receives an instruction transmitted by the network side to select an uplink transmission carrier of a specific cell as the uplink transmission primary carrier, via a layer-3, layer-2, or layer-1 command; or the processing unit receives a notification transmitted by the network side about sub-frame configuration information of the uplink transmission primary carrier, including a correspondence relationship between a cell corresponding to the uplink transmission primary carrier, and a sub-frame; or the processing unit receives a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

In a possible implementation, in the switching apparatus above according to the embodiment of the invention, the processing unit configured to receive the instruction transmitted by the network side to select the uplink transmission carrier of the specific cell as the uplink transmission primary carrier, via the layer-3 command, then the obtaining unit is further configured: to obtain configured resources of the uplink transmission carrier of the specific cell from the layer-3 command; and the processing unit configured to switch the uplink transmission primary carrier to the uplink transmission carrier corresponding to the new cell, over the configured resources of the uplink transmission carrier of the new cell is configured: to switch the uplink transmission primary carrier to the uplink transmission carrier corresponding to the new cell over the configured resources of the uplink transmission carrier of the specific cell obtained from the layer-3 command.

In a possible implementation, in the switching apparatus above according to the embodiment of the invention, the processing unit is configured to determine that the uplink transmission primary carrier needs to be switched, in one of the following schemes: the processing unit determines that a transmission carrier where a preamble sequence is active needs to be selected as the uplink transmission primary carrier, in a random access procedure initiated by the apparatus; the processing unit determines that a carrier where a D-SR is active needs to be selected as the uplink transmission primary carrier, in a D-SR procedure initiated by the apparatus; and the processing unit determines that an uplink transmission carrier of one of the plurality of cells needs to be selected as the uplink transmission primary carrier, upon reception of an uplink scheduling command transmitted by the network side for the cell.

In a possible implementation, in the switching apparatus above according to the embodiment of the invention, the processing unit configured to determine that the transmission carrier where the preamble sequence is active needs to be selected as the uplink transmission primary carrier, in the random access random initiated by the apparatus is further configured: if the apparatus currently selects an uplink transmission carrier of a secondary cell as the uplink transmission primary carrier, and the secondary cell is not configured with CBRA and D-SR resources, then if the apparatus needs to initiate an uplink scheduling request, to switch the apparatus to a primary cell to initiate a CBRA, and to select an uplink transmission carrier of the primary cell as the uplink transmission primary carrier; or if the apparatus currently selects an uplink transmission carrier of a secondary cell as the uplink transmission primary carrier, and the secondary cell is only configured with a D-SR resource, then if the apparatus fails to transmit a D-SR over the secondary cell, to switch the UE to a primary cell to initiate a CBRA, and to select an uplink transmission carrier of the primary cell as the uplink transmission primary carrier; or if the apparatus currently selects an uplink transmission carrier of a secondary cell as the uplink transmission primary carrier, and the transmission quality of the secondary cell is not satisfactory, to select the uplink transmission carrier of the primary cell as the uplink transmission primary carrier, and to initiate an RA update.

In a possible implementation, in the switching apparatus above according to the embodiment of the invention, the processing unit configured to determine that the carrier where the D-SR is active needs to be selected as the uplink transmission primary carrier, in the D-SR procedure initiated by the apparatus is further configured: if the apparatus currently selects an uplink transmission carrier of a secondary cell as the uplink transmission primary carrier, and the secondary cell is not configured with CBRA and D-SR resources, then if the apparatus needs to initiate an uplink scheduling request, to switch the apparatus to a primary cell to initiate a D-SR, and to select an uplink transmission carrier of the primary cell as the uplink transmission primary carrier.

In a possible implementation, in the switching apparatus above according to the embodiment of the invention, for the deselected uplink transmission carrier, the processing unit is further configured: to maintain all the configured resources of the uplink transmission carrier; and/or to stop all the transmission over the uplink transmission carrier; and/or to clear a Hybrid Automatic Repeat Request (HARQ) buffer corresponding to the uplink transmission carrier, and uplink grant information corresponding to the uplink transmission carrier; and/or to reset an uplink Media Access Control (MAC) related context.

In a possible implementation, in the switching apparatus above according to the embodiment of the invention, the processing unit is further configured: if the apparatus currently selects an uplink transmission carrier corresponding to a primary cell as the uplink transmission primary carrier, then if the apparatus receives a command transmitted by the network side to activate a secondary cell, to only activate the downlink transmission resource of the secondary cell; and if the apparatus currently selects an uplink transmission carrier corresponding to a secondary cell as the uplink transmission primary carrier, then if the apparatus receives a command transmitted by the network side to deactivate the secondary cell, to only deactivate the uplink transmission resource of the secondary cell, and to select an uplink transmission carrier corresponding to a primary cell as the uplink transmission primary carrier.

In a possible implementation, in the switching apparatus above according to the embodiment of the invention, the apparatus further includes a reporting unit connected with the obtaining unit, configured, before the apparatus obtains the transmission resources of the set of cells for serving the UE as notified by the network side, to report capability information about a capability of the UE to support switching the uplink transmission primary carrier to the network side.

In a possible implementation, in the switching apparatus above according to the embodiment of the invention, the processing unit is configured, if the apparatus determines that the uplink transmission primary carrier needs to be switched, at an instance n of time, to validate a new uplink transmission primary carrier at an instance n+k of time, wherein k>=0; and to stop transmitting over the original uplink transmission primary carrier at the instance n of time, or the instance n+k of time.

A base station including some embodiments of the invention includes the apparatus above for controlling an uplink transmission primary carrier switch according to the embodiment of the invention.

In the base station above according to the embodiment of the invention including the apparatus for controlling an uplink transmission primary carrier switch according to the embodiment of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

A user equipment according to some embodiments of the invention includes the apparatus above for controlling an uplink transmission primary carrier switch according to the embodiment of the invention.

In the user equipment above according to the embodiment of the invention including the apparatus for switching an uplink transmission primary carrier according to the embodiment of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

DETAILED DESCRIPTION OF THE EMBODIMENTS

Implementations of a switching control method and apparatus, a switching method and apparatus, a base station, and a UE according to embodiments of the invention will be described below in details with reference to the drawings.

Figure 1:
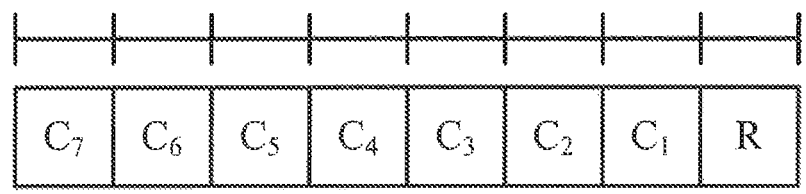
FIG. 1 is a schematic structural diagram of the format of the media access control element in the prior art.
Figure 2:
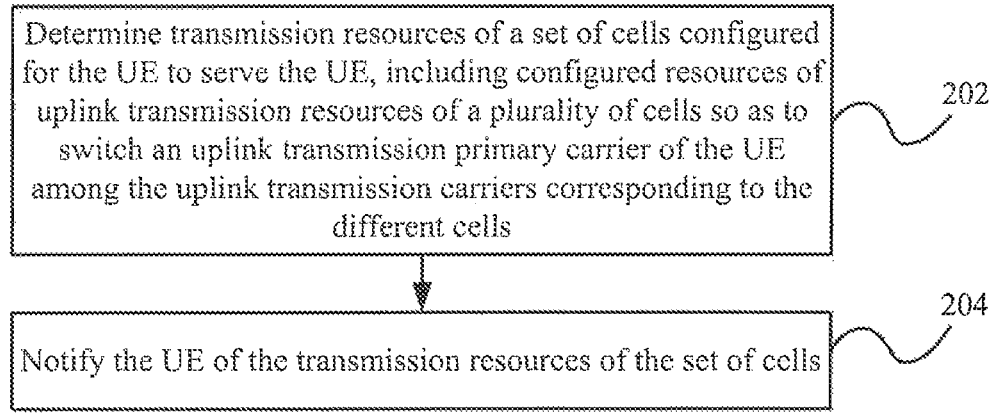
FIG. 2 is a schematic flow chart of a method for controlling an uplink transmission primary carrier switch according to some embodiments of the invention.

A method for controlling an uplink transmission primary carrier switch according to some embodiments of the invention at the base station side as illustrated in FIG. 2 includes the following steps:

The step 202 is to determine transmission resources of a set of cells configured for a UE to serve the UE, including configured resources of uplink transmission resources of a plurality of cells so as to switch an uplink transmission primary carrier of the UE among the uplink transmission carriers corresponding to the different cells; and The step 204 is to notify the UE of the transmission resources of the set of cells.

In some embodiments of the invention, an uplink transmission carrier over which the UE currently transmits uplink data will be referred to as an uplink transmission primary carrier.

In the method for controlling an uplink transmission primary carrier switch according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In some embodiments, both the mobility and the security at the Non-Access Stratum (NAS) of the UE are bound with the PCell instead of varying with the uplink transmission primary carrier being switched among the different cells.

Of course, the base station determines the transmission resources of the set of cells configured for the UE to serve the UE as uplink transmission resources and downlink carrier resources of the UE, that is, the UE can configure both uplink transmission resources and downlink carrier resources of the plurality of cells in the set of cell, and then notify the UE of them all together so as to improve the efficiency of configuring the resources.

In some embodiments, if the UE only supports aggregation of downlink carriers, or the UE is capable of transmitting over a single carrier in the uplink, then the set of cells for serving the UE may still include uplink transmission carriers of the plurality of cells, but in order not to exceed the capacity of uplink transmission carriers of the UE, the uplink transmission carrier of only one cell among the uplink transmission carriers of the plurality of cells can be the uplink transmission primary carrier of the UE at a time; and of course, if the UE supports aggregation of uplink carriers, then uplink transmission carriers of more than one cell may be aggregated as the uplink transmission primary carrier of the UE while guaranteeing the capacity of uplink transmission carriers of the UE.

Such a scenario will be described below in connection with embodiments of the invention that the uplink transmission primary carrier of the UE is switched in the set of cells configured for the UE to serve the UE. For example, the UE only supports aggregation of downlink transmission carriers, and the set of cells configured for the UE to serve the UE includes one macro cell and one small cell, where the macro cell is a primary cell, and the small cell is a secondary cell; and since there is a larger coverage area of the macro cell than that of the small cell, an uplink transmission carrier of the macro cell is selected by default as the uplink transmission primary carrier. If the user moves frequently, then the uplink transmission carrier of the macro cell will be selected as the uplink transmission primary carrier to thereby avoid service transmission from being interrupted, and the signaling load in the core network from being increased due to the frequent handover while the UE is moving in the case of transmission over an uplink transmission carrier of the small cell; and if the user has resided in the small cell for a long period of time, then in order to lower the transmit power of the UE over the uplink transmission carrier and the interference thereof to another UE, the UE will be switched to transmit over the uplink transmission carrier of the small cell, that is, the uplink transmission carrier of the small cell will be selected as the uplink transmission primary carrier of the UE.

In some embodiments of the invention, if there are a plurality of cells, e.g., one primary cell and one secondary cell, in the set of cells for serving the UE, there an uplink transmission carrier and a downlink transmission carrier of the primary cell will be selected by default to transmit data between the UE and the base station; and as the UE is moving, if the base station determines through positioning or from a measurement by the UE that the quality of transmission over an uplink transmission carrier of the secondary cell is higher than the quality of transmission over the uplink transmission carrier of the primary cell, but the quality of transmission over the downlink transmission carrier of the primary cell is higher than the quality of transmission over a downlink transmission carrier of the secondary cell, then the uplink transmission primary carrier will be switched to the secondary cell while the downlink transmission carrier is still the downlink transmission carrier of the primary cell, so that as compared with the prior art in which both the downlink transmission carrier and the downlink transmission carrier are switched to another cell, the uplink transmission carrier and the downlink transmission carrier of the different cells can operate so as to improve the efficiency of data transmission while considering both the transmission advantages of the different cell.

In the switching control method according to embodiments of the invention, the configured resources of the uplink transmission carrier of each cell include CBRA, D-SR, and PUCCH resources.

In some embodiments, although the configured resources of the uplink transmission carrier are configured in each of the plurality of cells in the set of cells for serving the UE, some uplink transmission primary carrier resource may not be accessible in the cell corresponding to the uplink transmission primary carrier, for example, if the base station configures the UE with PUCCH resources over the plurality of cells, then only the PUCCH resource among the uplink transmission resources of the cell corresponding to the uplink transmission primary carrier will be accessible; and/or if the base station configures the UE with CBRA related resources over the plurality of cells, then only the CBRA resource among the uplink transmission resources of the cell corresponding to the uplink transmission primary carrier will be accessible; and/or given the UE transmitting over a single carrier in the uplink, if an uplink transmission resource of any one cell is selected as the uplink transmission primary carrier, then the UE will disable automatically the uplink transmission carriers, including a PUSCH and/or an SRS, in the other cells. It shall be noted that if the UE selects an uplink transmission resource of any one cell as the uplink transmission primary carrier, then a downlink transmission carrier linked by a System Information Block 2 (SIB2) corresponding to the cell will be in an active state.

In some embodiments of the invention, the UE only supports aggregation of downlink transmission carriers, and transmission over a single carrier in the uplink, and the set of cells configured for the UE to serve the UE includes one macro cell and one small cell, where the macro cell is a primary cell, and the small cell is a secondary cell; and uplink transmission primary carrier resources including CBRA, D-SR, and PUCCH resources are configured in both the macro cell and the small cell. Both the uplink transmission carrier and the downlink transmission carrier of the UE are transmitted by default over the macro cell, and if the UE is instructed by the base station to be switched to transmit over the uplink transmission carrier of the small cell, then the CBRA, D-SR, and PUCCH resources configured in the small cell will be accessible, and the CBRA, D-SR, and PUCCH resources configured in the macro cell will not be accessible; and also transmission including a PUCCH and/or an SRS will be stopped over the uplink transmission carrier of the macro cell, and the downlink transmission carrier of the small cell will be activated.

In the switching control method according to some embodiments of the invention, the method further includes instructing the UE to switch the uplink transmission primary carrier.

In some embodiments, the base station instructs the UE to switch the uplink transmission primary carrier, and if there are more than two cells to serve the UE, then a cell to be selected will be determined directly among the plurality of cells to thereby improve the accuracy in switching the cell. For example, the set of cells for serving the UE includes one primary cell and seven secondary cells, and the base station can transmit an instruction to specify directly such one of the eight cells that corresponds to the uplink transmission primary carrier. Particularly in the switching control method according to the embodiments of the invention, the UE can be instructed by the base station to switch the uplink transmission primary carrier, in one or more of the following schemes.

In a first scheme, the UE is instructed via a layer-3, layer-2, or layer-1 command to select an uplink transmission carrier of a specific cell as the uplink transmission primary carrier.

In some embodiments of the invention, for example, the UE only supports aggregation of downlink carriers, and only supports uplink transmission over a single carrier, and the UE is capable of switching the uplink transmission primary carrier, that is, the set of cells for serving the UE can include two cells, but the UE can only transmit over an uplink transmission carrier configured in one of the cells in the uplink at a time.

The UE is instructed via a layer-3, layer-2, or layer-1 command to select an uplink transmission carrier of a specific cell as the uplink transmission primary carrier in the following steps:

In a first step, the set of cells for serving the UE includes one PCell and one SCell, both of which provide the UE with uplink transmission resources and downlink transmission resources, for example, the base station configures the UE with D-SR, PUCCH, and SRS uplink transmission resources over both the PCell and the SCell;

In a second step, the UE receives the configured uplink transmission resources and downlink transmission resources of the PCell and the SCell as notified by the base station, and then selects by default an uplink transmission carrier of the PCell as the uplink transmission primary carrier;

In a third step, the base station obtains transmitted signal qualities of the cells through positioning or from a measurement by the UE, and if the base station determines that there is a higher transmitted signal quality of the UE over the SCell, then the base station will transmit a layer-3, layer-2, or layer-1 (L3/L2/L1) command to instruct the UE to activate a downlink transmission carrier of the SCell, and the UE will start to transmit over the downlink transmission carrier of the SCell;

In a fourth step, if the base station determines that the UE has resided in the SCell for a long period of time, and decides to also switch the uplink transmission carrier of the UE to the SCell, then the base station will transmit an L3/L2/L1 command to the UE to instruct the UE to switch the uplink transmission primary carrier to the SCell;

In a fifth step; the UE receives the command to switch the uplink transmission primary carrier to the SCell, at an instance n of time, and then switches the uplink transmission primary carrier at an instance n+k of time, that is, the UE starts to transmit over the uplink transmission carrier of the SCell instead of the uplink transmission carrier of the PCell at the instance n+k of time, and the base station schedules the UE in the uplink over the SCell at the instance n+k of time;

In a sixth step, the UE stopping transmitting over the uplink transmission carrier of the PCell can also clear a HARQ data buffer over the PCell, and uplink transmission primary carrier grant information corresponding to the PCell; and In a seventh step, if the UE starts to transmit over the uplink transmission carrier of the SCell, then both of uplink feedbacks corresponding to the downlink transmission carriers of the PCell and the SCell will be transmitted over the uplink transmission carrier of the SCell, and if there UE has uplink traffic to be transmitted, then the UE will initiate a request via a D-SR of the SCell.

In some embodiments of the invention, for example, the UE only supports aggregation of downlink carriers, and only supports uplink transmission over a single carrier, and the UE is capable of switching the uplink transmission primary carrier, that is, the set of cells for serving the UE can include two cells, but the UE can only transmit over an uplink transmission carrier configured in one of the cells in the uplink at a time.

The UE is instructed via a layer-3, layer-2, or layer-1 command to select an uplink transmission carrier of a specific cell as the uplink transmission primary carrier in the following steps:

In a first step, the base station selects an uplink transmission carrier of the SCell as the uplink transmission primary carrier of the UE;

In a second step, the base station transmits an L3/L2/L1 command to instruct the UE to switch the uplink transmission primary carrier to the PCell; and In a third step, the UE stops transmitting over the uplink transmission carrier of the SCell, and switches to transmit over an uplink transmission carrier of the PCell; and also makes feedbacks of downlink transmission carriers of the SCell and the PCell, and transmits CSI/SRS over the PCell, and if the UE has uplink traffic to be transmitted, then the UE will initiate a D-SR procedure over the PCell.

In a second scheme, the UE is notified via a layer-3, layer-2, or layer-1 command about sub-frame configuration information of the uplink transmission primary carrier, including a correspondence relationship between a cell corresponding to the uplink transmission primary carrier, and a sub-frame.

In some embodiments of the invention, for example, the UE only supports aggregation of downlink carriers, and only supports uplink transmission over a single carrier, and the UE is capable of switching the uplink transmission primary carrier, that is, the set of cells for serving the UE can include two cells, but the UE can only transmit over an uplink transmission carrier configured in one of the cells in the uplink at a time.

The UE is instructed via a layer-3, layer-2, or layer-1 command about sub-frame configuration information of the uplink transmission primary carrier in the following steps:

In a first step, the base station configures the uplink transmission primary carrier of the UE with a piece of sub-frame configuration information including a correspondence relationship between a cell corresponding to the uplink transmission primary carrier, and a sub-frame, for example, if there is a periodicity of 20 sub-frames, then an uplink transmission carrier of the PCell will be the uplink transmission primary carrier of the UE in the first two sub-frames, the cell corresponding to the uplink transmission primary carrier will be switched in the k-th sub-frame, and an uplink transmission carrier of the SCell will be the uplink transmission primary carrier of the UE in the remaining 18-k sub-frames;

In a second step, the UE receives the sub-frame configuration information notified by the base station, and then indicates the uplink transmission carrier of the corresponding cell as the uplink transmission primary carrier according to the sub-frame configuration information; and In a third step, the UE can transmit feedbacks of downlink transmission carriers of the SCell and the PCell, and transmission of CSI/SRS to the cell corresponding to the currently selected uplink transmission primary carrier.

In a third scheme, configured resources of an uplink transmission carrier of a secondary cell which is currently the uplink transmission primary carrier of the UE are deactivated to instruct the UE to select an uplink transmission carrier of a primary cell as the uplink transmission primary carrier.

In some embodiments of the invention, for example, the UE only supports aggregation of downlink carriers, and only supports uplink transmission over a single carrier, and the UE is capable of switching the uplink transmission primary carrier, that is, the set of cells for serving the UE can include two cells, but the UE can only transmit over an uplink transmission carrier configured in one of the cells in the uplink at a time.

The configured resources of the uplink transmission carrier of the secondary cell which is currently the uplink transmission primary carrier of the UE are deactivated to instruct the UE to select the uplink transmission carrier of the primary cell as the uplink transmission primary carrier in the following steps:

In a first step, the base station selects the uplink transmission carrier of the SCell as the uplink transmission primary carrier of the UE;

In a second step, the base station transmits a command to deactivate configured resources of the uplink transmission carrier of the SCell which is currently the uplink transmission primary carrier of the UE, and to switch the uplink transmission primary carrier to the uplink transmission carrier of the PCell; and In a third step UE, the UE receives the command to deactivate the configured resources of the uplink transmission carrier of the SCell, and after a delay of k instances of time, the UE stops transmitting over the uplink transmission carrier of the SCell, and switches to transmit over the uplink transmission carrier of the PCell; and also makes feedbacks of downlink transmission carriers of the SCell and the PCell, and transmits CSI/SRS over the PCell, and if the UE has uplink traffic to be transmitted, then the UE will initiate a D-SR procedure over the PCell.

In the method above for controlling the switching according to some embodiments of the invention, if the UE is instructed via the layer-3 command to select the uplink transmission carrier of the specific cell as the uplink transmission primary carrier, then the layer-3 command will further include configured resources of the uplink transmission carrier of the specific cell.

In some embodiments, the base station can instruct the UE via the layer-3 (L3) command to select the uplink transmission carrier of the specific cell as the uplink transmission primary carrier by carrying the configured resources corresponding to the uplink transmission carrier of the specific cell, and preferably the configured resources includes a D-SR, SRS, CSI, PUCCH, and/or an SCell RA, so if an uplink transmission carrier of any one cell is deselected as the uplink transmission primary carrier, then configured resources in the cell will be maintained or released.

In the method above for controlling the switching according to some embodiments of the invention, the number of cells providing the UE with configured resources of uplink transmission carriers is more than or equal to the largest number of cells corresponding to uplink transmission carriers over which the UE really transmits in the uplink.

In some embodiments, the number of cells providing the UE with configured resources of uplink transmission carriers is more than or equal to the largest number of cells corresponding to uplink transmission carriers over which the UE really transmits in the uplink, so that the uplink transmission primary carrier of the UE can be switched among the plurality of different cells. For example, if there are three cells, including one primary cell and two secondary cells, providing the UE with configured resources of uplink transmission carriers, but the UE only supports transmission over a single carrier in the uplink, that is, the largest number of cells corresponding to uplink transmission carriers over which the UE really transmits in the uplink is one, then only the uplink transmission carrier of one of the three cells will be selected as the uplink transmission primary carrier of the UE at a time.

In the method above for controlling the switching according to some embodiments of the invention, before the transmission resources of the set of cells configured for the UE to serve the UE are determined, the method further includes: receiving capability information reported by the UE about the capability of the UE to support switching of the uplink transmission primary carrier; and the transmission resources of the set of cells configured for the UE to serve the UE are determined particularly by determining the transmission resources of the set of cells configured for the UE to serve the UE, based upon the capability information reported by the UE.

Of course, merely in some preferred embodiments of the invention, only if the UE reports to the base station that it supports the capability to support switching of the uplink transmission primary carrier, then the base station will enable the related function and configuration of the UE to switch the uplink transmission primary carrier, according to the capability of the UE, and a strategy of the base station. Even if the UE does not report to the base station that it supports the capability to support switching of the uplink transmission primary carrier, then the base station may enable the related function and configuration of the UE to switch the uplink transmission primary carrier.

Figure 3:
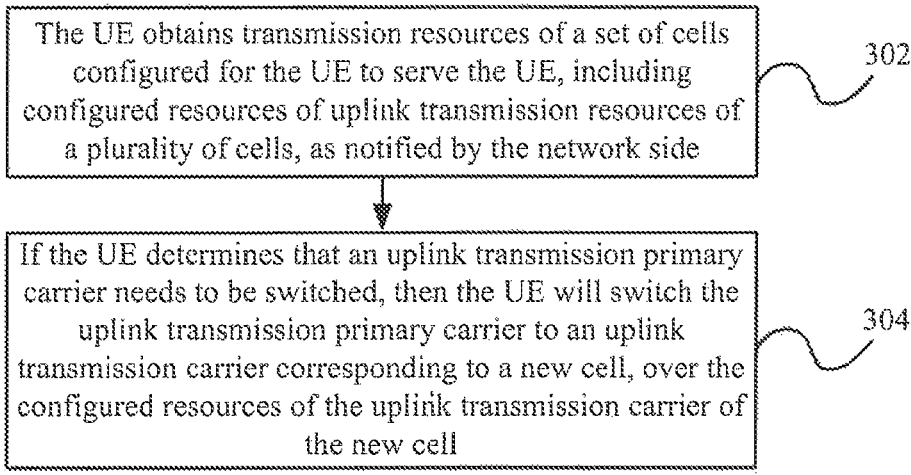
FIG. 3 is a schematic flow chart of a method for switching an uplink transmission primary carrier according to some embodiments of the invention.

A method for switching an uplink transmission primary carrier according to some embodiments of the invention at the user equipment side as illustrated in FIG. 3 includes the following steps:

In the step 302, the UE obtains transmission resources of a set of cells configured for the UE to serve the UE, including configured resources of uplink transmission resources of a plurality of cells, as notified by the network side; and In the step 304, if the UE determines that an uplink transmission primary carrier needs to be switched, then the UE will switch the uplink transmission primary carrier to an uplink transmission carrier corresponding to a new cell, over the configured resources of the uplink transmission carrier of the new cell.

In the method for switching an uplink transmission primary carrier according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In the switching method above according to some embodiment of the invention, the UE determines that the uplink transmission primary carrier needs to be switched, according to an instruction transmitted by the network side to switch the uplink transmission primary carrier.

In the switching method above according to some embodiments of the invention, the base station instructs the UE to switch the uplink transmission primary carrier, and if there are more than two cells to serve the UE, then a cell to be selected will be determined directly among the plurality of cells to thereby improve the accuracy in switching the cell.

In the switching method above according to some embodiments of the invention, the UE receives the instruction transmitted by the network side to switch the uplink transmission primary carrier, in one of the following schemes: the UE receives an instruction transmitted by the network side to select an uplink transmission carrier of a specific cell as the uplink transmission primary carrier, via a layer-3, layer-2, or layer-1 command; or the UE receives a notification transmitted by the network side about sub-frame configuration information of the uplink transmission primary carrier, including a correspondence relationship between a cell corresponding to the uplink transmission primary carrier, and a sub-frame; or the UE receives a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

In the switching method above according to some embodiments of the invention, if the UE receives the instruction transmitted by the network side to select the uplink transmission carrier of the specific cell as the uplink transmission primary carrier, via the layer-3 command, then the method will further include: the UE obtains configured resources of the uplink transmission carrier of the specific cell from the layer-3 command; and the UE switches the uplink transmission primary carrier to the uplink transmission carrier corresponding to the new cell, over the configured resources of the uplink transmission carrier of the new cell particularly as follows: the UE switches the uplink transmission primary carrier to the uplink transmission carrier corresponding to the new cell over the configured resources of the uplink transmission carrier of the specific cell obtained from the layer-3 command.

In the switching method above according to some embodiments of the invention, the UE determines that the uplink transmission primary carrier needs to be switched, in one of the following schemes: the UE determines that a transmission carrier where a preamble sequence is active needs to be selected as the uplink transmission primary carrier, in a random access procedure initiated by the UE; the UE determines that a carrier where a D-SR is active needs to be selected as the uplink transmission primary carrier, in a D-SR procedure initiated by the UE; and the UE determines that an uplink transmission carrier of one of the plurality of cells needs to be selected as the uplink transmission primary carrier, upon reception of an uplink scheduling command transmitted by the network side for the cell.

In the switching method above according to some embodiments of the invention, the UE can switch the cell corresponding to the uplink transmission primary carrier upon reception of the command transmitted by the base station, but also determine the uplink transmission carrier of the corresponding cell, to be selected as the uplink transmission primary carrier, among the plurality of cells according to the uplink transmission resources of the plurality of cells, so that the UE selects among the uplink transmission resources of the plurality of cells, thus well adapting to the uplink transmission service of the UE, and also selects among the different cells as needed for the service, thus resulting in high flexibility.

Of course, in some embodiments of the invention, the uplink transmission primary carrier of the UE may be switched among the plurality of cells to serve the UE, in response to the instruction of the base station, or may be selected and switched by the UE according to the uplink transmission resources of the plurality of cells, or may be switched in a combination thereof.

The following description will be made, in connection with embodiments of the invention, of how the UE selects an uplink transmission carrier of one of the plurality of cells as the uplink transmission primary carrier upon reception of an uplink scheduling command transmitted by the network side for the cell.

In some embodiments of the invention, the set of cells for serving the UE which only supports transmission over a single carrier in the uplink includes two cells, i.e., a PCell and an SCell, in both of which there are uplink transmission resources and downlink transmission resources configured, and the UE is capable of switching the uplink transmission primary carrier, and only activates a downlink transmission carrier of the SCell; and the base station schedules the UE to transmit over an uplink transmission carrier of the SCell, so that the UE activates the uplink transmission carrier of the SCell, and deactivates an uplink transmission carrier of the PCell, at an instance of time when a corresponding PUSCH is transmitted. Alike the base station can activate the PCell in the uplink.

In the switching method above according to some embodiments of the invention, the UE can determine that the transmission carrier where the preamble sequence is active needs to be selected as the uplink transmission primary carrier, in the random access random initiated by the UE in the following several embodiments.

In a first embodiment, if the UE currently selects an uplink transmission carrier of a secondary cell as the uplink transmission primary carrier, and the secondary cell is not configured with CBRA and D-SR resources, then if the UE needs to initiate an uplink scheduling request, then the UE will be switched to a primary cell to initiate a CBRA, and select an uplink transmission carrier of the primary cell as the uplink transmission primary carrier.

Optionally the set of cells for serving the UE which only supports transmission over a single carrier in the uplink includes two cells, i.e., a PCell and an SCell, in both of which there are uplink transmission resources and downlink transmission resources configured, and the UE is capable of switching the uplink transmission primary carrier, but the base station does not configure the SCell with D-SR and CBRA resources, or no D-SR or CBRA is allowed to be transmitted over the SCell; and if the uplink transmission carrier of the SCell is selected as the uplink transmission primary carrier, if the UE has an uplink scheduling request to be transmitted, then the UE will select automatically the uplink transmission carrier of the PCell as the uplink transmission primary carrier, and transmit a D-SR or a CBRA.

In a second embodiment, if the UE currently selects an uplink transmission carrier of a secondary cell as the uplink transmission primary carrier, and the secondary cell is only configured with a D-SR resource, then if the UE fails to transmit a D-SR over the secondary cell, then the UE will be switched to a primary cell to initiate a CBRA, and select an uplink transmission carrier of the primary cell as the uplink transmission primary carrier.

Optionally the set of cells for serving the UE which only supports transmission over a single carrier in the uplink includes two cells, i.e., a PCell and an SCell, in both of which there are uplink transmission resources and downlink transmission resources configured, and the UE is capable of switching the uplink transmission primary carrier; if the uplink transmission carrier of the SCell is selected as the uplink transmission primary carrier, then there may be a radio link failure of the UE over the SCell; if the UE detects the radio link failure over the SCell, then the UE will select automatically the uplink transmission carrier of the PCell as the uplink transmission primary carrier, and transmit a D-SR or a CBRA; the UE transmits a radio link failure indicator in a PCell uplink grant (UL grant) allocated by the base station for the UE; and the base station configures the UE to release the uplink transmission resource of the SCell, or reconfigures the UE with an uplink transmission resource of the SCell.

In a third embodiment, if the UE currently selects an uplink transmission carrier of a secondary cell as the uplink transmission primary carrier, and the transmission quality of the secondary cell is not satisfactory, then the UE will select the uplink transmission carrier of the primary cell as the uplink transmission primary carrier, and initiate a Routing Area (RA) update.

Optionally if the UE selects an uplink transmission carrier of some cell as the uplink transmission primary carrier, then once the quality of the uplink transmission carrier is degraded, or the transmission quality thereof is not satisfactory, for example, the transmission quality is degraded, a Radio Resource Management (e.g., RRM) measurement is below some threshold, or a timer (T310) expires in a Radio Link Management (RLM) procedure, the UE will switch the uplink transmission primary carrier to an uplink transmission carrier of another cell to thereby guarantee the transmission quality of the uplink transmission carrier of the UE.

In the switching method above according to some embodiments of the invention, if the UE determines that the carrier where the D-SR is active needs to be selected as the uplink transmission primary carrier, in the D-SR procedure initiated by the UE, then the method will further include: if the UE currently selects an uplink transmission carrier of a secondary cell as the uplink transmission primary carrier, and the secondary cell is not configured with CBRA and D-SR resources, then if the UE needs to initiate an uplink scheduling request, then the UE will be switched to a primary cell to initiate a D-SR, and select an uplink transmission carrier of the primary cell as the uplink transmission primary carrier.

In the switching method above according to some embodiments of the invention, for the deselected uplink transmission carrier, the method further includes one or more of the following steps: the UE maintains all the configured resources of the uplink transmission carrier; the UE stops all the transmission over the uplink transmission carrier; the UE clears a Hybrid Automatic Repeat Request (HARQ) buffer corresponding to the uplink transmission carrier, and uplink grant information corresponding to the uplink transmission carrier; and the UE resets an uplink Media Access Control (MAC) related context.

In some embodiments, for the deselected uplink transmission carrier, all the configured resources of the uplink transmission carrier are maintained so that the uplink transmission carrier can be reselected as the uplink transmission primary carrier, and also the HARQ buffer corresponding to the uplink transmission carrier is cleared to release a storage space of the base station or a server, and the uplink grant information corresponding to the uplink transmission carrier is cleared to grant another uplink transmission carrier as the uplink transmission primary carrier so as to avoid the grant information from conflicting with each other, and the capacity of uplink transmission carriers of the UE from being exceeded.

In the switching method above according to some embodiments of the invention, the method further includes: if the UE currently selects an uplink transmission carrier corresponding to a primary cell as the uplink transmission primary carrier, then if the UE receives a command transmitted by the network side to activate a secondary cell, then the UE will only activate the downlink transmission resource of the secondary cell; and if the UE currently selects an uplink transmission carrier corresponding to a secondary cell as the uplink transmission primary carrier, then if the UE receives a command transmitted by the network side to deactivate the secondary cell, then the UE will only deactivate the uplink transmission resource of the secondary cell, and select an uplink transmission carrier corresponding to a primary cell as the uplink transmission primary carrier.

In some embodiments, the base station can instruct the UE to activate or deactivate the uplink transmission resource or the downlink transmission resource of the corresponding cell by activating or deactivating both the uplink transmission resource and the downlink transmission resource of the corresponding cell, or only the uplink transmission resource or the downlink transmission resource of the corresponding cell.

In some embodiments of the invention, the set of cells for serving the UE transmitting over a single carrier in the uplink includes two cells, i.e., a PCell and an SCell, and the UE is capable of switching the uplink transmission primary carrier, and selects the uplink transmission carrier of the PCell as the current uplink transmission primary carrier; and if the base station transmits a command to activate the SCell, then the UE will only activate the downlink transmission resource of the SCell because the UE transmits over a single carrier in the uplink, and selects the uplink transmission carrier of the PCell as the uplink transmission primary carrier.

In another more particular embodiment of the invention, the set of cells for serving the UE transmitting over a single carrier in the uplink includes two cells, i.e., a PCell and an SCell, and the UE is capable of switching the uplink transmission primary carrier, and selects the uplink transmission carrier of the SCell as the current uplink transmission primary carrier; and if the base station transmits a command to deactivate the SCell, then since the UE transmits over a single carrier in the uplink, and can support aggregation of downlink carriers, the UE will only deactivate the uplink transmission resource of the SCell, and select the uplink transmission carrier of the PCell as the uplink transmission primary carrier.

In the switching method above according to some embodiments of the invention, before the UE obtains the transmission resources of the set of cells for serving the UE as notified by the network side, the method further includes: the UE reports capability information about the capability of the UE to support switching the uplink transmission primary carrier to the network side.

In the switching method above according to some embodiments of the invention, if the UE determines that the uplink transmission primary carrier needs to be switched, at an instance n of time, then a new uplink transmission primary carrier will be validated at an instance n+k of time, where k>=0; and the UE will stop transmitting over the original uplink transmission primary carrier at the instance n of time, or the instance n+k of time.

In some embodiments of the invention, there is a delay in switching the uplink transmission primary carrier by the UE, and the uplink transmission primary carrier is switched at such an instance of time that if the UE decides to switch the uplink transmission primary carrier (for example, the UE receives the instruction transmitted by the base station to switch the uplink transmission primary carrier), at an instance n of time, then a new uplink transmission primary carrier will be validated at an instance n+k of time, that is, if the UE needs to transmit in the uplink, then the UE will transmit over the uplink transmission carrier of the cell after the switching, where k>=0, and the UE will stop transmitting over the original uplink transmission carrier at the instance n of time, or the instance n+k of time.

Figure 4:
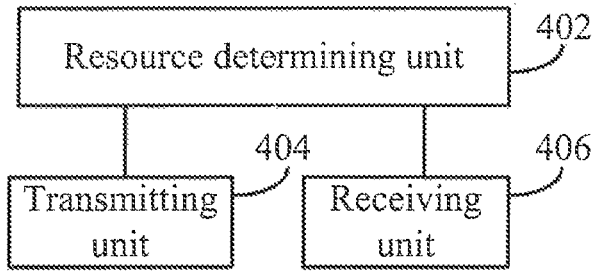
FIG. 4 is a schematic structural diagram of an apparatus for controlling an uplink transmission primary carrier switch according to some embodiments of the invention.

An apparatus for controlling an uplink transmission primary carrier switch according to some embodiments of the invention as illustrated in FIG. 4 includes: a resource determining unit 402 configured to determine transmission resources of a set of cells configured for a User Equipment (UE) to serve the UE, including configured resources of uplink transmission resources of a plurality of cells so as to switch an uplink transmission primary carrier of the UE among the uplink transmission carriers corresponding to the different cells; and a transmitting unit 404 connected with the resource determining unit 402 is configured to notify the UE of the transmission resources of the set of cells.

In the apparatus for controlling an uplink transmission primary carrier switch according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In some embodiments, if the UE only supports aggregation of downlink carriers, or the UE is capable of transmitting over a single carrier in the uplink, then the set of cells for serving the UE may still include uplink transmission carriers of the plurality of cells, but in order not to exceed the capacity of uplink transmission carriers of the UE, the uplink transmission carrier of only one cell among the uplink transmission carriers of the plurality of cells can be the uplink transmission primary carrier of the UE at a time; and of course, if the UE supports aggregation of uplink carriers, then uplink transmission carriers of more than one cell may be aggregated as the uplink transmission primary carrier of the UE while guaranteeing the capacity of uplink transmission carriers of the UE.

In the switching control apparatus according to some embodiments of the invention, the configured resources of the uplink transmission carrier of each cell include CBRA, D-SR, and PUCCH resources.

In the switching control apparatus according to some embodiments of the invention, the transmitting unit 404 is further configured to instruct the UE to switch the uplink transmission primary carrier.

In some embodiments, the base station instructs the UE to switch the uplink transmission primary carrier, and if there are more than two cells to serve the UE, then a cell to be selected will be determined directly among the plurality of cells to thereby improve the accuracy in switching the cell.

In some embodiments, in the switching control apparatus according to the embodiment of the invention, the transmitting unit 404 is configured to instruct the UE to switch the uplink transmission primary carrier, in one or more of the following schemes, where the UE can be instructed by the base station in one or more of the following schemes.

In a first scheme, the UE is instructed via a layer-3, layer-2, or layer-1 command to select an uplink transmission carrier of a specific cell as the uplink transmission primary carrier.

In a second scheme, the UE is notified via a layer-3, layer-2, or layer-1 command about sub-frame configuration information of the uplink transmission primary carrier, including a correspondence relationship between a cell corresponding to the uplink transmission primary carrier, and a sub-frame.

In a third scheme, configured resources of an uplink transmission carrier of a secondary cell which is currently the uplink transmission primary carrier of the UE are deactivated to instruct the UE to select an uplink transmission carrier of a primary cell as the uplink transmission primary carrier.

In the switching control apparatus according to some embodiments of the invention, the transmitting unit 404 is configured to instruct the UE via the layer-3 command to select the uplink transmission carrier of the specific cell as the uplink transmission primary carrier, where the layer-3 command further includes configured resources of the uplink transmission carrier of the specific cell.

In the switching control apparatus according to some embodiments of the invention, the number of cells providing the UE with configured resources of uplink transmission carriers is more than or equal to the largest number of cells corresponding to uplink transmission carriers over which the UE really transmits in the uplink.

In some embodiments, the number of cells providing the UE with configured resources of uplink transmission carriers is more than or equal to the largest number of cells corresponding to uplink transmission carriers over which the UE really transmits in the uplink, so that the uplink transmission primary carrier of the UE can be switched among the plurality of different cells. For example, if there are three cells, including one primary cell and two secondary cells, providing the UE with configured resources of uplink transmission carriers, but the UE only supports transmission over a single carrier in the uplink, that is, the largest number of cells corresponding to uplink transmission carriers over which the UE really transmits in the uplink is one, then only the uplink transmission carrier of one of the three cells will be selected as the uplink transmission primary carrier of the UE at a time.

The switching control apparatus according to some embodiments of the invention further includes a receiving unit 406 connected with the resource determining unit 402, configured to receive capability information reported by the UE about a capability of the UE to support switching of the uplink transmission primary carrier, before the transmission resources of the set of cells configured for the UE to serve the UE are determined; and the resource determining unit 402 configured to determine the transmission resources of the set of cells configured for the UE to serve the UE is configured to determine the transmission resources of the set of cells configured for the UE to serve the UE, based upon the capability information reported by the UE.

In the apparatus for controlling an uplink transmission primary carrier switch according to some embodiments of the invention, the resource determining unit 402 can be embodied as a central processor or a monolithic processor, the transmitting unit 404 can be embodied as a transmitter or a signal transmitter, and the receiving unit 404 can be embodied as a receiver or a signal receiver.

Figure 5:
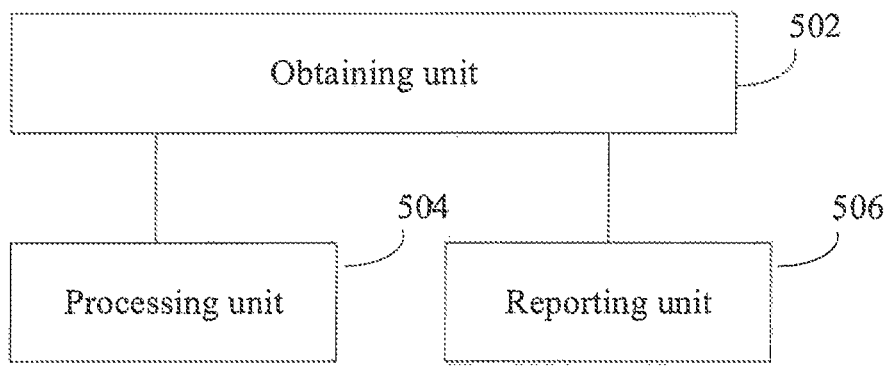
FIG. 5 is a schematic structural diagram of an apparatus for switching an uplink transmission primary carrier according to some embodiments of the invention.

An apparatus for switching an uplink transmission primary carrier according to some embodiments of the invention as illustrated in FIG. 5 includes: an obtaining unit 502 is configured to obtain transmission resources of a set of cells configured for a UE to serve the UE, including configured resources of uplink transmission resources of a plurality of cells, as notified by the network side; and a processing unit 504 connected with the obtaining unit 502 is configured, if the apparatus determines that an uplink transmission primary carrier needs to be switched, to switch the uplink transmission primary carrier to an uplink transmission carrier corresponding to a new cell, over the configured resources of the uplink transmission carrier of the new cell.

In the apparatus for switching an uplink transmission primary carrier according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

In the switching apparatus above according to some embodiments of the invention, the processing unit 504 is configured to determine that the uplink transmission primary carrier needs to be switched, according to an instruction transmitted by the network side to switch the uplink transmission primary carrier.

In the switching apparatus above according to some embodiments of the invention, a base station instructs the UE to switch the uplink transmission primary carrier, and if there are more than two cells to serve the UE, then a cell to be selected will be determined directly among the plurality of cells to thereby improve the accuracy in switching the cell.

In the switching apparatus according to some embodiments of the invention, the processing unit 504 is configured to receive the instruction transmitted by the network side to switch the uplink transmission primary carrier, in one of the following schemes: the processing unit 504 receives an instruction transmitted by the network side to select an uplink transmission carrier of a specific cell as the uplink transmission primary carrier, via a layer-3, layer-2, or layer-1 command; or the processing unit 504 receives a notification transmitted by the network side about sub-frame configuration information of the uplink transmission primary carrier, including a correspondence relationship between a cell corresponding to the uplink transmission primary carrier, and a sub-frame; or the processing unit 504 receives a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

In the switching apparatus according to some embodiments of the invention, when the processing unit 504 receives the instruction transmitted by the network side to select the uplink transmission carrier of the specific cell as the uplink transmission primary carrier, the obtaining unit 502 is further configured: to obtain configured resources of the uplink transmission carrier of the specific cell from the layer-3 command; and the processing unit 504 configured to switch the uplink transmission primary carrier to the uplink transmission carrier corresponding to the new cell, over the configured resources of the uplink transmission carrier of the new cell is configured to switch the uplink transmission primary carrier to the uplink transmission carrier corresponding to the new cell over the configured resources of the uplink transmission carrier of the specific cell obtained from the layer-3 command.

In the switching apparatus according to some embodiments of the invention, the processing unit 504 is configured to determine that the uplink transmission primary carrier needs to be switched, in one of the following schemes: the processing unit 504 determines that a transmission carrier where a preamble sequence is active needs to be selected as the uplink transmission primary carrier, in a random access procedure initiated by the apparatus; the processing unit 504 determines that a carrier where a D-SR is active needs to be selected as the uplink transmission primary carrier, in a D-SR procedure initiated by the apparatus; and the processing unit 504 determines that an uplink transmission carrier of one of the plurality of cells needs to be selected as the uplink transmission primary carrier, upon reception of an uplink scheduling command transmitted by the network side for the cell.

In the switching apparatus according to some embodiments of the invention, the UE can switch the cell corresponding to the uplink transmission primary carrier upon reception of the command transmitted by the base station, but also determine the uplink transmission carrier of the corresponding cell, to be selected as the uplink transmission primary carrier, among the plurality of cells according to the uplink transmission resources of the plurality of cells, so that the UE selects among the uplink transmission resources of the plurality of cells, thus well adapting to the uplink transmission service of the UE, and also selects among the different cells as needed for the service, thus resulting in high flexibility.

In the switching apparatus according to some embodiments of the invention, the processing unit 504 configured to determine that the transmission carrier where the preamble sequence is active needs to be selected as the uplink transmission primary carrier, in the random access random initiated by the apparatus is further configured: if the apparatus currently selects an uplink transmission carrier of a secondary cell as the uplink transmission primary carrier, and the secondary cell is not configured with CBRA and D-SR resources, then if the apparatus needs to initiate an uplink scheduling request, to switch the apparatus to a primary cell to initiate a CBRA, and to select an uplink transmission carrier of the primary cell as the uplink transmission primary carrier; or if the apparatus currently selects an uplink transmission carrier of a secondary cell as the uplink transmission primary carrier, and the secondary cell is only configured with a D-SR resource, then if the apparatus fails to transmit a D-SR over the secondary cell, to switch the UE to a primary cell to initiate a CBRA, and to select an uplink transmission carrier of the primary cell as the uplink transmission primary carrier; or if the apparatus currently selects an uplink transmission carrier of a secondary cell as the uplink transmission primary carrier, and the transmission quality of the secondary cell is not satisfactory, to select the uplink transmission carrier of the primary cell as the uplink transmission primary carrier, and to initiate an RA update.

In the switching apparatus according to some embodiments of the invention, when the processing unit 504 determines that the carrier where the D-SR is active needs to be selected as the uplink transmission primary carrier, in the D-SR procedure initiated by the apparatus, the processing unit 504 is further configured: if the apparatus currently selects an uplink transmission carrier of a secondary cell as the uplink transmission primary carrier, and the secondary cell is not configured with CBRA and D-SR resources, then if the apparatus needs to initiate an uplink scheduling request, to switch the apparatus to a primary cell to initiate a D-SR, and to select an uplink transmission carrier of the primary cell as the uplink transmission primary carrier.

In the switching apparatus according to some embodiments of the invention, for the deselected uplink transmission carrier, the processing unit 504 is further configured: to maintain all the configured resources of the uplink transmission carrier; and/or to stop all the transmission over the uplink transmission carrier; and/or to clear a Hybrid Automatic Repeat Request (HARQ) buffer corresponding to the uplink transmission carrier, and uplink grant information corresponding to the uplink transmission carrier; and/or to reset an uplink Media Access Control (MAC) related context.

In some embodiments, for the deselected uplink transmission carrier, all the configured resources of the uplink transmission carrier are maintained so that the uplink transmission carrier can be reselected as the uplink transmission primary carrier, and also the HARQ buffer corresponding to the uplink transmission carrier is cleared to release a storage space of the base station or a server, and the uplink grant information corresponding to the uplink transmission carrier is cleared to grant another uplink transmission carrier as the uplink transmission primary carrier so as to avoid the grant information from conflicting with each other, and the capacity of uplink transmission carriers of the UE from being exceeded.

In the switching apparatus according to some embodiments of the invention, the processing unit 504 is further configured: if the apparatus currently selects an uplink transmission carrier corresponding to a primary cell as the uplink transmission primary carrier, then if the apparatus receives a command transmitted by the network side to activate a secondary cell, to only activate the downlink transmission resource of the secondary cell; and if the apparatus currently selects an uplink transmission carrier corresponding to a secondary cell as the uplink transmission primary carrier, then if the apparatus receives a command transmitted by the network side to deactivate the secondary cell, to only deactivate the uplink transmission resource of the secondary cell, and to select an uplink transmission carrier corresponding to a primary cell as the uplink transmission primary carrier.

In some embodiments, the base station can instruct the UE to activate or deactivate the uplink transmission resource or the downlink transmission resource of the corresponding cell by activating or deactivating both the uplink transmission resource and the downlink transmission resource of the corresponding cell, or only the uplink transmission resource or the downlink transmission resource of the corresponding cell.

The switching apparatus according to some embodiments of the invention further includes a reporting unit 506 connected with the obtaining unit 502, configured, before the apparatus obtains the transmission resources of the set of cells for serving the UE as notified by the network side, to report capability information about a capability of the UE to support switching the uplink transmission primary carrier to the network side.

In the switching apparatus according to some embodiments of the invention, the processing unit 504 is configured, if the apparatus determines that the uplink transmission primary carrier needs to be switched, at an instance n of time, to validate a new uplink transmission primary carrier at an instance n+k of time, where k>=0; and to stop transmitting over the original uplink transmission primary carrier at the instance n of time, or the instance n+k of time.

In some embodiments of the invention, there is a delay in switching the uplink transmission primary carrier by the UE, and the uplink transmission primary carrier is switched particularly at such an instance of time that if the UE decides to switch the uplink transmission primary carrier (for example, the UE receives the instruction transmitted by the base station to switch the uplink transmission primary carrier), at an instance n of time, then a new uplink transmission primary carrier will be validated at an instance n+k of time, that is, if the UE needs to transmit in the uplink, then the UE will transmit over the uplink transmission carrier of the cell after the switching, where k>=0, and the UE will stop transmitting over the original uplink transmission carrier at the instance n of time, or the instance n+k of time.

In the apparatus for controlling an uplink transmission primary carrier switch according to some embodiments of the invention, the obtaining unit 502 can be embodied as a receiver or a signal receiver, the processing unit 504 can be embodied as a central processor or a monolithic processor, and the reporting unit 506 can be embodied as a transmitter or a signal transmitter.

A base station according to some embodiments of the invention includes the apparatus for controlling an uplink transmission primary carrier switch according to some embodiments of the invention.

In the base station according to some embodiments of the invention including the apparatus for controlling an uplink transmission primary carrier switch according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

A user equipment according to some embodiments of the invention includes the apparatus for switching an uplink transmission primary carrier according to some embodiments of the invention.

In the user equipment according to some embodiments of the invention including the apparatus for switching an uplink transmission primary carrier according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission, so that as compared with the prior art in which the macro cell is deployed as a primary cell, and transmission is made over the uplink transmission carrier of the macro cell, the significant interference to another UE due to the high transmit power can be avoided; as compared in the prior art in which the small cell is deployed as a primary cell, and transmission is made over the uplink transmission carrier of the small cell, the interruption in service transmission, and the increased signaling load in the core network, due to the frequent cell handover while the UE is moving can be avoided; and as compared with the prior art in which the cell handover is made as a handover among the cells for both the uplink transmission carrier and the downlink transmission carrier of the UE, the cell handover can be made as a handover among the cells for only the uplink transmission carrier of the UE while considering both the transmission advantages of the different cells.

Figure 6:
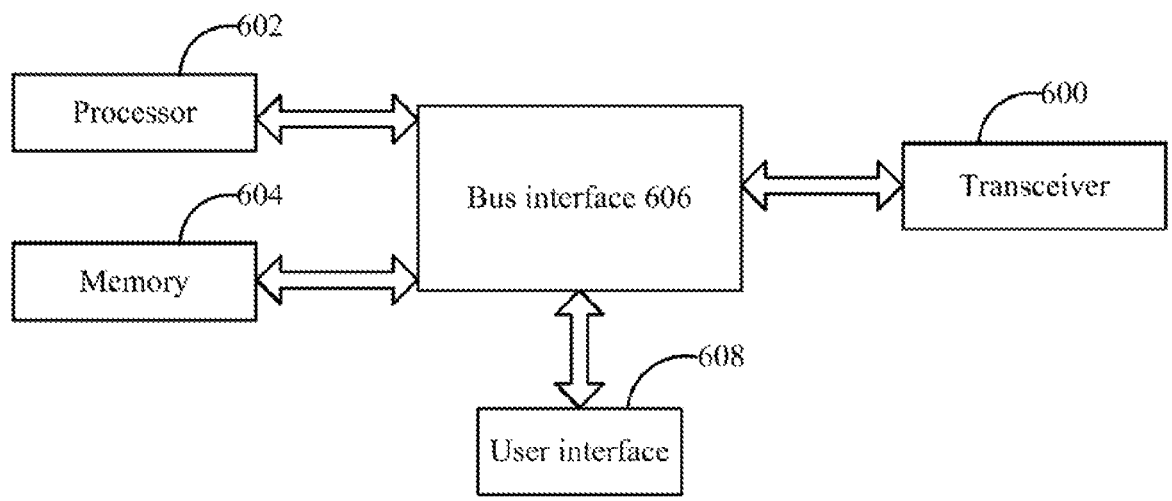
FIG. 6 is a schematic structural diagram of a base station according to some embodiments of the invention.

Further to the method and apparatus at the base station side for controlling an uplink transmission primary carrier switch according to some embodiments above of the invention, a base station according to some embodiments of the invention as illustrated in FIG. 6 includes a transceiver 600, a processor 602, and a memory 604; and further a bus interface 606 and a user interface 608, where:

The processor 602 is configured to read programs in the memory to perform the processes of: determining transmission resources of a set of cells configured for a User Equipment (UE) to serve the UE, including configured resources of uplink transmission resources of a plurality of cells, and to notify the UE of the transmission resources of the set of cells through the transceiver 600 so as to switch an uplink transmission primary carrier of the UE among the uplink transmission carriers corresponding to the different cells; and The memory 604 is configured to store one or executable programs configured to configure the processor 602.

Here in FIG. 6, the bus architecture can include any number of interconnected buses and bridges to link together various circuits including one or more processors represented by the processor 602, and one or more memories represented by the memory 604. The bus architecture can further link together various other circuits, e.g., peripheral devices, a voltage stabilizer, a power management circuit, etc., and all of these circuits are well known in the art, so a further description thereof will be omitted in this context. The transceiver can include a number of elements, e.g., a transmitter and a receiver, configured to provide units for communication with various other devices over a transmission medium. The processor 602 is responsible for managing the bus architecture and typical processes, and the memory 604 can store data to be used by the processor 602 in operation. The bus interface 606 provides an interface. For different user equipments, the user interface 608 can also be an interface via which external or internal devices are connected as appropriate, where the connected devices include but will not be limited to a keypad, a display, a speaker, a microphone, a joystick, etc. In some embodiments, the configured resources of the uplink transmission carrier of each cell include CBRA, D-SR, and PUCCH resources.

In some embodiments, the processor 602 is further configured to instruct the UE through the transceiver 600 to switch the uplink transmission primary carrier.

In some embodiments, the processor 602 is configured to instruct the UE via a layer-3, layer-2, or layer-1 command to select an uplink transmission carrier of a specific cell as the uplink transmission primary carrier; or to notify the UE via a layer-3, layer-2, or layer-1 command about sub-frame configuration information of the uplink transmission primary carrier, including a correspondence relationship between a cell corresponding to the uplink transmission primary carrier, and a sub-frame; or to deactivate configured resources of an uplink transmission carrier of a secondary cell which is currently the uplink transmission primary carrier of the UE to instruct the UE to select an uplink transmission carrier of a primary cell as the uplink transmission primary carrier.

In some embodiments, the processor 602 is configured, if the UE is instructed via the layer-3 command to select the uplink transmission carrier of the specific cell as the uplink transmission primary carrier, to further include configured resources of the uplink transmission carrier of the specific cell in the layer-3 command.

In some embodiments, the number of cells providing the UE with configured resources of uplink transmission carriers is more than or equal to the largest number of cells corresponding to uplink transmission carriers over which the UE really transmits in the uplink.

In some embodiments, the processor 602 is further configured, before the transmission resources of the set of cells configured for the UE to serve the UE are determined, to receive capability information reported by the UE about a capability of the UE to support switching of the uplink transmission primary carrier, through the transceiver 600; and the processor 602 configured to determine the transmission resources of the set of cells configured for the UE to serve the UE is configured to determine the transmission resources of the set of cells configured for the UE to serve the UE, based upon the capability information reported by the UE.

Figure 7:
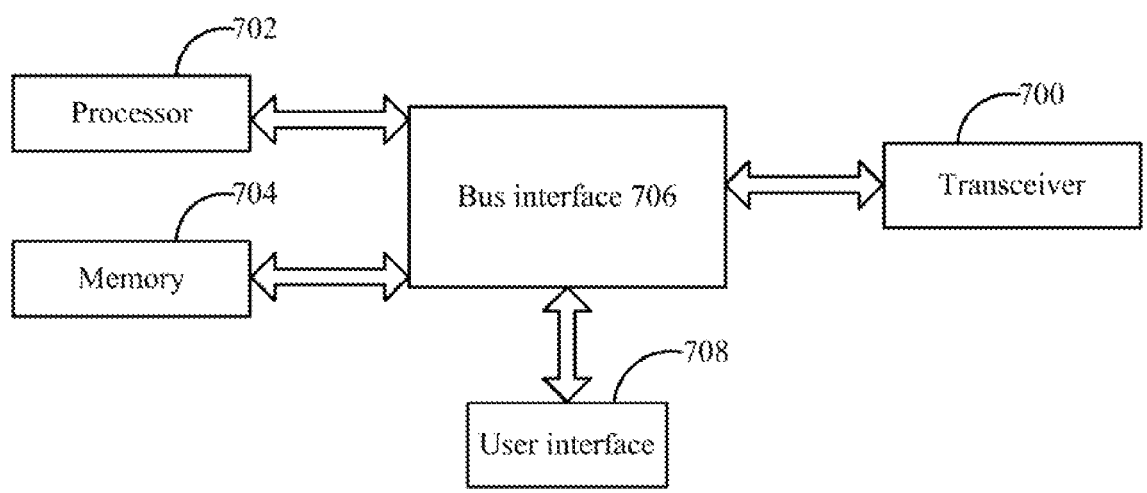
FIG. 7 is a schematic structural diagram of a user equipment according to some embodiments of the invention.

Further to the method and apparatus for switching an uplink transmission primary carrier according to some embodiments above of the invention, a User Equipment (UE) according to some embodiments of the invention as illustrated in FIG. 7 includes a transceiver 700, a processor 702, and a memory 704; and further a bus interface 706 and a user interface 708, where:

The processor 702 is configured to read programs in the memory 704 to perform the processes of: obtaining transmission resources of a set of cells configured for the UE to serve the UE, including configured resources of uplink transmission resources of a plurality of cells, as notified by the network side through the transceiver 700; and if the UE determines that an uplink transmission primary carrier needs to be switched, then switching the uplink transmission primary carrier to an uplink transmission carrier corresponding to a new cell, over the configured resources of the uplink transmission carrier of the new cell;

The memory 704 is configured to store one or executable programs configured to configure the processor 702.

Here in FIG. 7, the bus architecture can include any number of interconnected buses and bridges to link together various circuits including one or more processors represented by the processor 702, and one or more memories represented by the memory 704. The bus architecture can further link together various other circuits, e.g., peripheral devices, a voltage stabilizer, a power management circuit, etc., and all of these circuits are well known in the art, so a further description thereof will be omitted in this context. The transceiver can include a number of elements, e.g., a transmitter and a receiver, configured to provide units for communication with various other devices over a transmission medium. The processor 702 is responsible for managing the bus architecture and typical processes, and the memory 704 can store data to be used by the processor 702 in operation. The bus interface 706 provides an interface. For different user equipments, the user interface 708 can also be an interface via which external or internal devices are connected as appropriate, where the connected devices include but will not be limited to a keypad, a display, a speaker, a microphone, a joystick, etc.

In some embodiments, the processor 702 is configured to determine that the uplink transmission primary carrier needs to be switched, according to an instruction transmitted by the network side to switch the uplink transmission primary carrier.

In some embodiments, the processor 702 is configured to receive the instruction transmitted by the network side to switch the uplink transmission primary carrier, in one of the following schemes: the processor 702 receives an instruction transmitted by the network side to select an uplink transmission carrier of a specific cell as the uplink transmission primary carrier, via a layer-3, layer-2, or layer-1 command; or the processor 702 receives a notification transmitted by the network side about sub-frame configuration information of the uplink transmission primary carrier, including a correspondence relationship between a cell corresponding to the uplink transmission primary carrier, and a sub-frame; or the processor 702 receives a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

In some embodiments, the processor 702 is configured to receive the instruction transmitted by the network side to select the uplink transmission carrier of the specific cell as the uplink transmission primary carrier, via the layer-3 command is further configured: to obtain configured resources of the uplink transmission carrier of the specific cell from the layer-3 command; and the processor 702 configured to switch the uplink transmission primary carrier to the uplink transmission carrier corresponding to the new cell, over the configured resources of the uplink transmission carrier of the new cell is configured to switch the uplink transmission primary carrier to the uplink transmission carrier corresponding to the new cell over the configured resources of the uplink transmission carrier of the specific cell obtained from the layer-3 command.

In some embodiments, the processor 702 is configured to determine that the uplink transmission primary carrier needs to be switched, in one of the following schemes: the processor 702 determines that a transmission carrier where a preamble sequence is active needs to be selected as the uplink transmission primary carrier, in a random access procedure initiated by the UE; the processor 702 determines that a carrier where a D-SR is active needs to be selected as the uplink transmission primary carrier, in a D-SR procedure initiated by the UE; and the processor 702 determines that an uplink transmission carrier of one of the plurality of cells needs to be selected as the uplink transmission primary carrier, upon reception of an uplink scheduling command transmitted by the network side for the cell.

In some embodiments, when the processor 702 determines that the transmission carrier where the preamble sequence is active needs to be selected as the uplink transmission primary carrier, in the random access random initiated by the UE, the processor 702 is further configured: if the UE currently selects an uplink transmission carrier of a secondary cell as the uplink transmission primary carrier, and the secondary cell is not configured with CBRA and D-SR resources, then if the apparatus needs to initiate an uplink scheduling request, to switch the apparatus to a primary cell to initiate a CBRA, and to select an uplink transmission carrier of the primary cell as the uplink transmission primary carrier; or if the UE currently selects an uplink transmission carrier of a secondary cell as the uplink transmission primary carrier, and the secondary cell is only configured with a D-SR resource, then if the UE fails to transmit a D-SR over the secondary cell, to switch the UE to a primary cell to initiate a CBRA, and to select an uplink transmission carrier of the primary cell as the uplink transmission primary carrier; or if the UE currently selects an uplink transmission carrier of a secondary cell as the uplink transmission primary carrier, and the transmission quality of the secondary cell is not satisfactory, to select the uplink transmission carrier of the primary cell as the uplink transmission primary carrier, and to initiate an RA update.

In some embodiments, the processor 702 determines that the carrier where the D-SR is active needs to be selected as the uplink transmission primary carrier, in the D-SR procedure initiated by the UE, the processor 702 is further configured: if the UE currently selects an uplink transmission carrier of a secondary cell as the uplink transmission primary carrier, and the secondary cell is not configured with CBRA and D-SR resources, then if the UE needs to initiate an uplink scheduling request, to switch the apparatus to a primary cell to initiate a D-SR, and to select an uplink transmission carrier of the primary cell as the uplink transmission primary carrier.

In some embodiments, for the deselected uplink transmission carrier, the processor 702 is further configured: to maintain all the configured resources of the uplink transmission carrier; and/or to stop all the transmission over the uplink transmission carrier; and/or to clear a Hybrid Automatic Repeat Request (HARQ) buffer corresponding to the uplink transmission carrier, and uplink grant information corresponding to the uplink transmission carrier; and/or to reset an uplink Media Access Control (MAC) related context.

In some embodiments, the processor 702 is further configured: if the UE currently selects an uplink transmission carrier corresponding to a primary cell as the uplink transmission primary carrier, then if the apparatus receives a command transmitted by the network side to activate a secondary cell, to only activate the downlink transmission resource of the secondary cell; and if the UE currently selects an uplink transmission carrier corresponding to a secondary cell as the uplink transmission primary carrier, then if the UE receives a command transmitted by the network side to deactivate the secondary cell, to only deactivate the uplink transmission resource of the secondary cell, and to select an uplink transmission carrier corresponding to a primary cell as the uplink transmission primary carrier.

In some embodiments, the processor 702 is further configured, before the UE obtains the transmission resources of the set of cells for serving the UE as notified by the network side, to report capability information about a capability of the UE to support switching the uplink transmission primary carrier to the network side, through the transceiver 700.

In some embodiments, the processor 702 is configured, if the UE determines that the uplink transmission primary carrier needs to be switched, at an instance n of time, to validate a new uplink transmission primary carrier at an instance n+k of time, where k>=0; and to stop transmitting over the original uplink transmission primary carrier at the instance n of time, or the instance n+k of time.

In the methods and apparatuses for switching an uplink transmission primary carrier, and for controlling the switching, the base station, and the user equipment according to some embodiments of the invention, the transmission resources of the set of cells configured for the UE to serve the UE are determined, so that the uplink transmission primary carrier of the UE can be switched among the different cells in the set of cells configured for the UE to serve the UE, thus enhancing the flexibility in transmitting over the uplink transmission primary carrier of the UE while considering both transmit power, and a demand of the UE for service transmission Those skilled in the art shall appreciate that the embodiments of the invention can be embodied as a method, a system or a computer program product. Therefore the invention can be embodied in the form of all-hardware embodiments, all-software embodiments or some embodiments of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for switching an uplink transmission primary carrier, the method comprises:

obtaining, by a User Equipment (UE), transmission resources of a set of cells configured for the UE to serve the UE, as notified by a network side, wherein the transmission resources comprise configured resources of uplink transmission carriers of a plurality of cells; and determining, by the UE, that the uplink transmission primary carrier needs to be switched, switching, by the UE, the uplink transmission primary carrier to an uplink transmission carrier corresponding to a new cell, over the configured resources of the uplink transmission carrier of the new cell;

wherein determining, by the UE, that the uplink transmission primary carrier needs to be switched, is through one of the following schemes:

determining, by the UE, that a transmission carrier where a preamble sequence is active needs to be selected as the uplink transmission primary carrier, in a random access procedure initiated by the UE;

determining, by the UE, that a carrier where a Dedicated Scheduling Request (D-SR) is active needs to be selected as the uplink transmission primary carrier, in a D-SR procedure initiated by the UE; and determining, by the UE, that an uplink transmission carrier of one of the plurality of cells needs to be selected as the uplink transmission primary carrier, upon reception of an uplink scheduling command transmitted by the network side for the cell; and when determining, by the UE, that the transmission carrier where the preamble sequence is active needs to be selected as the uplink transmission primary carrier, in the random access procedure initiated by the UE, the method further comprises:

when the UE currently selects an uplink transmission carrier of a secondary cell as the uplink transmission primary carrier, and the secondary cell is not configured with random access Contention Based Random Access (CBRA) and D-SR resources, when the UE needs to initiate an uplink scheduling request, switching, by the UE, to a primary cell to initiate a CBRA, and selecting an uplink transmission carrier of the primary cell as the uplink transmission primary carrier; or when the UE currently selects an uplink transmission carrier of a secondary cell as the uplink transmission primary carrier, and the secondary cell is only configured with a D-SR resource, when the UE fails to transmit a D-SR over the secondary cell, switching, by the UE, to a primary cell to initiate a CBRA, and selecting the uplink transmission carrier of the primary cell as the uplink transmission primary carrier; or when the UE currently selects an uplink transmission carrier of a secondary cell as the uplink transmission primary carrier, and the transmission quality of the secondary cell is not satisfactory, selecting, by the UE, the uplink transmission carrier of the primary cell as the uplink transmission primary carrier, and initiating a Routing Area (RA) update.

2. The method according to claim 1, wherein when receiving, by the UE, the instruction transmitted by the network side to select the uplink transmission carrier of the specific cell as the uplink transmission primary carrier, via the layer-3 command, the method further comprises: obtaining, by the UE, configured resources of the uplink transmission carrier of the specific cell from the layer-3 command; and switching, by the UE, the uplink transmission primary carrier to the uplink transmission carrier corresponding to the new cell, over the configured resources of the uplink transmission carrier of the new cell comprises:

switching, by the UE, the uplink transmission primary carrier to the uplink transmission carrier corresponding to the new cell over the configured resources of the uplink transmission carrier of the specific cell obtained from the layer-3 command.

3. The method according to claim 1, wherein when determining, by the UE, that the carrier where the D-SR is active needs to be selected as the uplink transmission primary carrier, in the D-SR procedure initiated by the UE, the method further comprises:
when the UE currently selects an uplink transmission carrier of a secondary cell as the uplink transmission primary carrier, and the secondary cell is not configured with CBRA and D-SR resources, when the UE needs to initiate an uplink scheduling request, switching, by the UE, to a primary cell to initiate a D-SR, and selecting an uplink transmission carrier of the primary cell as the uplink transmission primary carrier.

4. The method according to claim 1, wherein for a deselected uplink transmission carrier, the method further comprises any one or more of the steps of:
maintaining, by the UE, all the configured resources of the uplink transmission carrier;
stopping, by the UE, all the transmission over the uplink transmission carrier;
clearing, by the UE, a Hybrid Automatic Repeat Request (HARQ) buffer corresponding to the uplink transmission carrier, and uplink grant information corresponding to the uplink transmission carrier; and
resetting, by the UE, an uplink Media Access Control (MAC) related context.

5. The method according to claim 1, wherein the method further comprises:
when the UE currently selects an uplink transmission carrier corresponding to a primary cell as the uplink transmission primary carrier, when the UE receives a command transmitted by the network side to activate a secondary cell, only activating, by the UE, the downlink transmission resource of the secondary cell; and
when the UE currently selects an uplink transmission carrier corresponding to a secondary cell as the uplink transmission primary carrier, when the UE receives a command transmitted by the network side to deactivate the secondary cell, only deactivating, by the UE, the uplink transmission resource of the secondary cell, and selecting an uplink transmission carrier corresponding to a primary cell as the uplink transmission primary carrier.

6. The method according to claim 1, wherein before the UE obtains the transmission resources of the set of cells for serving the UE as notified by the network side, the method further comprises:
reporting, by the UE, capability information about a capability of the UE to support switching the uplink transmission primary carrier to the network side.

7. The method according to claim 1, wherein when the UE determines that the uplink transmission primary carrier needs to be switched, at an instance n of time, validating, a new uplink transmission primary carrier at an instance n+k of time, wherein k>=0; and stop transmitting over the original uplink transmission primary carrier at the instance n of time, or the instance n+k of time.

8. The method according to claim 1, wherein the UE determines that the uplink transmission primary carrier needs to be switched, according to an instruction transmitted by the network side to switch the uplink transmission primary carrier.

9. The method according to claim 8 wherein receiving, by the UE, the instruction transmitted by the network side to switch the uplink transmission primary carrier, is through one of the following schemes:

receiving an instruction transmitted by the network side to select an uplink transmission carrier of a specific cell as the uplink transmission primary carrier, via a layer-3, layer-2, or layer-1 command; or
receiving a notification transmitted by the network side about sub-frame configuration information of the uplink transmission primary carrier, comprising a correspondence relationship between a cell corresponding to the uplink transmission primary carrier, and a sub-frame; or
receiving a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

10. A User Equipment (UE), comprising a transceiver, a processor, and a memory, wherein:
the processor is configured to read programs in the memory to perform the processes of:
obtaining transmission resources of a set of cells configured for the UE to serve the UE, as notified by a network side through the transceiver, wherein the transmission resources comprise configured carriers of uplink transmission resources of a plurality of cells; and
determining that the uplink transmission primary carrier needs to be switched, switching the uplink transmission primary carrier to an uplink transmission carrier corresponding to a new cell, over the configured resources of the uplink transmission carrier of the new cell;
wherein the processor is configured to determine that the uplink transmission primary carrier needs to be switched, is through one of the following schemes:
determining that a transmission carrier where a preamble sequence is active needs to be selected as the uplink transmission primary carrier, in a random access procedure initiated by the UE;
determining that a carrier where a Dedicated Scheduling Request (D-SR) is active needs to be selected as the uplink transmission primary carrier, in a D-SR procedure initiated by the UE; and
determining that an uplink transmission carrier of one of the plurality of cells needs to be selected as the uplink transmission primary carrier, upon reception of an uplink scheduling command transmitted by the network side for the cell; and
wherein when the processor determines that the transmission carrier where the preamble sequence is active needs to be selected as the uplink transmission primary carrier, in the random access procedure initiated by the UE, the processor is further configured:
when currently selecting an uplink transmission carrier of a secondary cell as the uplink transmission primary carrier, and the secondary cell is not configured with random access Contention Based Random Access (CBRA) and D-SR resources, when it is necessary to initiate an uplink scheduling request, to switch to a primary cell to initiate a CBRA, and to select an uplink transmission carrier of the primary cell as the uplink transmission primary carrier; or
when currently selecting an uplink transmission carrier of a secondary cell as the uplink transmission primary carrier, and the secondary cell is only configured with a D-SR resource, when failing to transmit a D-SR over the secondary cell, to switch the UE to a primary cell to initiate a CBRA, and to select an uplink transmission carrier of the primary cell as the uplink transmission primary carrier; or when currently selecting an uplink transmission carrier of a secondary cell as the uplink transmission primary carrier, and the transmission quality of the secondary cell is not satisfactory, to select the uplink transmission carrier of the primary cell as the uplink transmission primary carrier, and to initiate a Routing Area (RA) update.

11. The user equipment according to claim 10, wherein when the processor receives the instruction transmitted by the network side to select the uplink transmission carrier of the specific cell as the uplink transmission primary carrier, via the layer-3 command, the processor is further configured:

to obtain configured resources of the uplink transmission carrier of the specific cell from the layer-3 command; and the processor switches the uplink transmission primary carrier to the uplink transmission carrier corresponding to the new cell, over the configured resources of the uplink transmission carrier of the new cell by:

switching the uplink transmission primary carrier to the uplink transmission carrier corresponding to the new cell over the configured resources of the uplink transmission carrier of the specific cell obtained from the layer-3 command.

12. The user equipment according to claim 10, wherein when the processor determines that the carrier where the D-SR is active needs to be selected as the uplink transmission primary carrier, in the D-SR procedure initiated by the UE, the processor is further configured:

when currently selecting an uplink transmission carrier of a secondary cell as the uplink transmission primary carrier, and the secondary cell is not configured with CBRA and D-SR resources, when it is necessary to initiate an uplink scheduling request, to switch to a primary cell to initiate a D-SR, and to select an uplink transmission carrier of the primary cell as the uplink transmission primary carrier.

13. The user equipment according to claim 10, wherein for a deselected uplink transmission carrier, the processor is further configured:

to maintain all the configured resources of the uplink transmission carrier; and/or to stop all the transmission over the uplink transmission carrier; and/or to clear a Hybrid Automatic Repeat Request (HARQ) buffer corresponding to the uplink transmission carrier, and uplink grant information corresponding to the uplink transmission carrier; and/or to reset an uplink Media Access Control (MAC) related context.

14. The user equipment according to claim 10, wherein the processor is further configured:

when currently selecting an uplink transmission carrier corresponding to a primary cell as the uplink transmission primary carrier, when receiving a command transmitted by the network side to activate a secondary cell, to only activate the downlink transmission resource of the secondary cell; and when currently selecting an uplink transmission carrier corresponding to a secondary cell as the uplink transmission primary carrier, when receiving a command transmitted by the network side to deactivate the secondary cell, to only deactivate the uplink transmission resource of the secondary cell, and to select an uplink transmission carrier corresponding to a primary cell as the uplink transmission primary carrier.

15. The user equipment according to claim 10, wherein the processor is further configured, before the UE obtains the transmission resources of the set of cells for serving the UE as notified by the network side, to report capability information about a capability of the UE to support switching the uplink transmission primary carrier to the network side, through the transceiver.

16. The user equipment according to claim 10, wherein the processor is configured, when determining that the uplink transmission primary carrier needs to be switched, at an instance n of time, to validate a new uplink transmission primary carrier at an instance n+k of time, wherein k>=0; and to stop transmitting over the original uplink transmission primary carrier at the instance n of time, or the instance n+k of time.

17. The user equipment according to claim 10, wherein the processor is configured to determine that the uplink transmission primary carrier needs to be switched, according to an instruction transmitted by the network side to switch the uplink transmission primary carrier.

18. The user equipment according to claim 17, wherein the processor is configured to receive the instruction transmitted by the network side to switch the uplink transmission primary carrier, is through one of the following schemes:

receiving an instruction transmitted by the network side to select an uplink transmission carrier of a specific cell as the uplink transmission primary carrier, via a layer-3, layer-2, or layer-1 command; or receiving a notification transmitted by the network side about sub-frame configuration information of the uplink transmission primary carrier, wherein the sub-frame configuration information comprises a correspondence relationship between a cell corresponding to the uplink transmission primary carrier, and a sub-frame; or receiving a command transmitted by the network side to deactivate configured resources of an uplink transmission carrier of a secondary cell, which is currently the uplink transmission primary carrier of the UE, as the instruction to instruct the UE to select an uplink transmission carrier of a primary cell as the uplink transmission primary carrier.

* * * * *